(12) United States Patent
Mouri et al.

(10) Patent No.: US 8,933,181 B2
(45) Date of Patent: Jan. 13, 2015

(54) BRANCHED POLYMERS AND METHODS FOR THEIR SYNTHESIS AND USE

(75) Inventors: Hiroshi Mouri, Akron, OH (US); Steven Luo, Copley, OH (US); Jessica Kurasch, Fairlawn, OH (US); Christopher G. Robertson, Akron, OH (US); Sandra Warren, Gradignan (FR)

(73) Assignee: Bridgestone Corporation, Tokyo (JP)

( * ) Notice: Subject to any disclaimer, the term of this patent is extended or adjusted under 35 U.S.C. 154(b) by 599 days.

(21) Appl. No.: 13/345,224

(22) Filed: Jan. 6, 2012

(65) Prior Publication Data

US 2012/0108755 A1 May 3, 2012

Related U.S. Application Data

(62) Division of application No. 12/444,463, filed as application No. PCT/US2007/021476 on Oct. 5, 2007, now Pat. No. 8,119,736.

(60) Provisional application No. 60/850,043, filed on Oct. 6, 2006.

(51) Int. Cl.
| | |
|---|---|
| *C08F 4/06* | (2006.01) |
| *C08F 4/70* | (2006.01) |
| *C08F 4/72* | (2006.01) |
| *C08G 81/02* | (2006.01) |
| *B60C 1/00* | (2006.01) |
| *C08C 19/44* | (2006.01) |
| *C08F 36/04* | (2006.01) |
| *C08F 297/08* | (2006.01) |
| *C08G 83/00* | (2006.01) |
| *C08L 21/00* | (2006.01) |
| *C08L 53/00* | (2006.01) |
| *C08L 9/00* | (2006.01) |
| *C08L 15/00* | (2006.01) |
| *C08L 19/00* | (2006.01) |

(52) U.S. Cl.
CPC ............... *C08G 81/021* (2013.01); *B60C 1/00* (2013.01); *B60C 1/0016* (2013.01); *C08C 19/44* (2013.01); *C08F 36/04* (2013.01); *C08F 297/08* (2013.01); *C08G 83/005* (2013.01); *C08L 21/00* (2013.01); *C08L 53/00* (2013.01); *C08L 9/00* (2013.01); *C08L 15/00* (2013.01); *C08L 19/006* (2013.01)
USPC ............................. 526/113; 526/115; 526/117

(58) Field of Classification Search
USPC .......................................... 526/113, 115, 117
See application file for complete search history.

(56) References Cited

U.S. PATENT DOCUMENTS

| | | | |
|---|---|---|---|
| 3,426,006 A | 2/1969 | Nutzel et al. | |
| 3,652,516 A | 3/1972 | Farrar | |
| 4,990,573 A | 2/1991 | Andreussi et al. | |
| 5,268,439 A | 12/1993 | Hergenrother et al. | |
| 5,329,005 A | 7/1994 | Lawson et al. | |
| 5,332,810 A | 7/1994 | Lawson et al. | |
| 5,393,721 A | 2/1995 | Kitamura et al. | |
| 5,491,230 A | 2/1996 | Lawson et al. | |
| 5,496,940 A | 3/1996 | Lawson et al. | |
| 5,521,309 A | 5/1996 | Antkowiak et al. | |
| 5,530,072 A | 6/1996 | Shirodkar | |
| 5,552,483 A | 9/1996 | Hergenrother et al. | |
| 5,567,784 A | 10/1996 | Wieder et al. | |
| 5,574,109 A | 11/1996 | Lawson et al. | |
| 5,578,542 A | 11/1996 | Lawson et al. | |
| 5,698,646 A | 12/1997 | Kitamura et al. | |
| 5,786,441 A | 7/1998 | Lawson et al. | |
| 5,786,448 A | 7/1998 | Nefzi et al. | |
| 6,025,450 A | 2/2000 | Lawson et al. | |
| 6,046,288 A | 4/2000 | Lawson et al. | |
| 6,080,853 A | 6/2000 | Corrigan et al. | |
| 6,153,706 A | 11/2000 | Letchford et al. | |
| 6,297,325 B1 | 10/2001 | Wideman et al. | |
| 6,506,848 B2 | 1/2003 | Hoenig et al. | |
| 6,630,535 B1 | 10/2003 | Hogan et al. | |
| 6,765,066 B2 * | 7/2004 | Ozawa | 525/314 |
| 6,908,975 B2 | 6/2005 | Jang et al. | |
| 6,992,147 B1 | 1/2006 | Ozawa et al. | |
| 7,030,195 B2 | 4/2006 | Viola et al. | |
| 7,153,919 B2 | 12/2006 | Hogan et al. | |
| 7,335,712 B2 | 2/2008 | Yan et al. | |
| 7,906,592 B2 * | 3/2011 | Luo | 525/331.9 |
| 2003/0176276 A1 | 9/2003 | Luo et al. | |
| 2005/0038197 A1 | 2/2005 | Tomalia et al. | |
| 2006/0173145 A1 | 8/2006 | Pawlow et al. | |
| 2006/0264589 A1 | 11/2006 | Yan et al. | |
| 2006/0264590 A1 | 11/2006 | Hogan et al. | |

FOREIGN PATENT DOCUMENTS

| | | | |
|---|---|---|---|
| EP | 0 314 256 A2 | 5/1989 | |
| EP | 0 942 005 A2 | 9/1999 | |
| JP | 11209439 A | 8/1999 | |
| WO | WO 2004 020475 A2 | 3/2004 | |
| WO | WO 2004 041870 A2 | 5/2004 | |

OTHER PUBLICATIONS

D.A. Tomalia, "The Dendritic State," MaterialsToday, Mar. 2005, pp. 34-46.

(Continued)

*Primary Examiner* — Nathan M Nutter
(74) *Attorney, Agent, or Firm* — Meredith E. Hooker; Arthur M. Reginelli

(57) ABSTRACT

Branched polymers including multi-branched polymers, functionalized branched polymers, star-branched polymers, and dendigraft polymers. Methods for the synthesis of branched polymers and method for the use of branched polymers in tire components are also included.

5 Claims, No Drawings

(56) References Cited

OTHER PUBLICATIONS

L.A. Archer & S.K. Varshney, "Synthesis and Relaxation Dynamics of Multiarm Polybutadiene Melts," Macromolecules, 1998, 31, pp. 6348-6355.

International Search Report for International Application No. PCT/US2007/021476, date of mailing Feb. 5, 2009; 6 pages.
International Preliminary Report on Patentability for International Application No. PCT/US2007/021476, date of issuance of report Apr. 7, 2009; 9 pages.

* cited by examiner

BRANCHED POLYMERS AND METHODS FOR THEIR SYNTHESIS AND USE

This application is a Divisional application of U.S. Non-Provisional application Ser. No. 12/444,463, filed on Jul. 22, 2009, and now U.S. Pat. No. 8,119,736, which gains the benefit of International Application Serial No. PCT/US2007/21476, filed on Oct. 5, 2007, and U.S. Provisional Application No. 60/850,043, filed Oct. 6, 2006, which are incorporated herein by reference.

FIELD OF THE INVENTION

One or more embodiments of the present invention relate to branched polymers, methods for their synthesis, and methods for their use.

BACKGROUND OF THE INVENTION

Pneumatic tires may be prepared by employing both natural and synthetic polymers. Natural polymers, such as natural rubber, provide rubber compositions with advantageous properties such as green strength and tack. These properties are particularly useful in the construction of the green tire. Natural rubber is also advantageously employed in many adhesive compositions. The chemical make-up of natural rubber, including microstructure and branching, advantageously provides adhesive properties that are often not realized with synthetic polymers.

SUMMARY OF THE INVENTION

One or more embodiments of the present invention provides a tire component comprising a vulcanized product of a polymer selected from the group consisting of (a) a polymer including a backbone, at least two branch points, and at least two branches extending from each of the branch points, where the backbone is characterized by a length at least 4 times the entanglement molecular weight of the backbone, where the branches are each characterized by a length at least 2 times the entanglement length of the branches, where the backbone is characterized by a glass transition temperature of less than 0° C., and where the backbone and the branches are miscible with one another, and (b) a polymer including a backbone having opposed ends, at least one branch point located at one opposed end, at least two branches extending from the at least one branch point, and filler-interactive functional group at the other opposed end, where the backbone is characterized by a length at least 4 times the entanglement length of the backbone, where the branches are each characterized by a length at least 2 times the entanglement length of the branches, where the backbone is characterized by a glass transition temperature of less than 0° C., and where the backbone and the branches are miscible with one another.

One or more embodiments of the present invention also provides a method of preparing a polymer, the method comprising the steps of (a) providing mono-living polymer characterized by a length that is at least 2 times the entanglement length of the mono-living polymer, (b) reacting the mono-living polymer with a branching agent, where the branching agent includes at least 3 reactive sites, and where the equivalents of reactive sites is in excess to the moles of mono-living polymer, thereby forming to form a branched terminating agent, (c) reacting the branched terminating agent with a di-living polymer, where the di-living polymer is characterized by a length that is at least 4 times the entanglement length of the di-living polymer.

One or more embodiments of the present invention further provides a method of preparing a polymer, the method comprising the steps of (a) contacting monomer with an anionic polymerization initiator having a functional group, thereby forming a polymerization medium, and thereby synthesizing functionalized living polymer, (b) allowing the synthesis of the functionalized living polymer to proceed to an extent that the functionalized living polymer are characterized by a length that is at least 4 times the entanglement molecular weight of the functionalized living polymer, (c) after said step (b), adding additional monomer and a non-functional anionic polymerization initiator to the polymerization medium, thereby synthesizing unfunctionalized living polymer, (d) allowing the synthesis of the unfunctionalized living polymer to proceed to an extent that the unfunctionalized living polymer are characterized by a length that is at least 2 times the entanglement molecular weight of the unfunctionalized living polymer, (e) after said step (d), adding a coupling agent to the polymerization medium, where the coupling agent includes at least 3 reactive sites.

One or more embodiments of the present invention also provides a method of preparing a polymer, the method comprising the steps of (a) providing a plurality of polymer molecules where the polymer molecules include branched molecules having at least one branch point, where at least 3 branches extend from the at least one branch point, and where the branches are characterized by a length that is at least 2 times the entanglement molecular weight of the branches, (b) adding a free-radical initiator to the polymerization medium.

One or more embodiments of the present invention further provides a method of preparing a polymer, the method comprising the steps of (a) contacting monomer with an anionic polymerization initiator, thereby forming a polymerization medium, and thereby synthesizing a living polymer, (b) allowing the synthesis of the living polymer to proceed to an extent that the living polymer are characterized by a length that is at least 2 times the entanglement molecular weight of the living polymer, (c) adding a grafting agent, a chain transfer agent, and optionally additional monomer to the polymerization medium, where the ratio of grafting agent to anionic polymerization initiator is from about 0.1 to 1 to about 2 to 1, and the ratio of chain transfer to grafting agent is from about 0.25 to 1 to about 2 to 1.

One or more embodiments of the present invention further provides a method of preparing a branched polymer comprising the steps of (a) polymerizing conjugated diene monomer with a catalyst system that is the combination or reaction product of (i) a lanthanide compound, (ii) an alkylating agent, (iii) a nickel-containing compound, and (iv) a source of halogen to form a high-cis polydiene; and (b) coupling the high-cis polydiene with a free radical source.

DETAILED DESCRIPTION OF ILLUSTRATIVE EMBODIMENTS

One or more embodiments of the present invention are directed toward branched polymers. Other embodiments are directed toward methods for preparing branched polymers. Still other embodiments are directed toward the use of branched polymers in the manufacture of tire components, as well as the tire components containing these branched polymers. These or other embodiments are directed toward polymeric blends including branched polymers, and the use of these blends in tire components.

Multi-Branched Polymers

In one or more embodiments, the branched polymers include multi-branched polymers. Multi-branched polymers include a backbone, at least two branch points, and at least two branches extending from the at least two branch points. For example, a multi-branched polymer of one or more embodiments can be represented by the formula

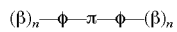

where π is a polymer backbone, each φ is a branch point, each β is independently a polymer branch, and each n is independently an integer equal to or greater than 2. In one or more embodiments, n is an integer from about 2 to about 6, and in other embodiments from about 3 to about 5, and in other embodiments from about 3 to about 4.

In one or more embodiments, the polymer backbone of the multi-branched polymer may be characterized by a length that is at least 2.5 times, in other embodiments at least about 3 times, in other embodiments at least 4 times, in other embodiments at least 5 times, and in other embodiments at least 6 times the entanglement molecular weight of the backbone.

The entanglement molecular weight refers to the molecular weight associated with or corresponding to a polymer chain length that is sufficiently large for entanglements to occur between molecules of undiluted polymer. This molecular weight can be experimentally derived by determining where the slope of a plot of log viscosity versus log molecular weight changes from 1.0 to 3.4; the change being associated with intermolecular entanglements. In one or more embodiments, the entanglement molecular weight refers to the weight associated with from about 80 to about 20 mer units, or in other embodiments from about 90 to about 150 mer units. Additional experimental techniques for determining the entanglement molecular weight of a polymer are summarized by W. W. Graessley in ADV. POLYM. SCI., Vol. 16, 1974, and are known by those skilled in the art.

In one or more embodiments, the polymer backbone of the multi-branched polymer may be characterized as a rubbery polymer. Rubbery polymers may include those polymers characterized by a glass transition temperature ($T_g$) of less than 0° C., in other embodiments less than −20° C., and in other embodiments less than −30° C. In one or more embodiments, the rubbery polymer chain exhibits a single glass transition temperature. In particular embodiments, the polymer backbone is unsaturated. In these or other embodiments, the polymer backbone is capable of being vulcanized to form an elastomeric vulcanizate. In other embodiments, the polymer backbone is saturated or substantially saturated, which may result from hydrogenation of the branched polymers.

In one or more embodiments, the polymer chain may include polymers and copolymers including one or more mer units deriving from dienes. In one or more embodiments, the polymer chain includes polymers prepared by anionic polymerization. Examples of these polymers include polybutadiene, polyisoprene, poly(styrene-co-butadiene), poly(styrene-co-butadiene-co-isoprene), poly(isoprene-co-styrene), and poly(butadiene-co-isoprene).

In one or more embodiments, the polymer branches of the multi-branched polymer may be characterized by a length that is at least 1 times, in other embodiments at least 1.5 times, in other embodiments at least 2 times, in other embodiments at least 3 times, and in other embodiments at least 4 times the entanglement molecular weight of the branches.

In one or more embodiments, the branches of the multi-branched polymer may be characterized as a rubbery polymer. Rubbery polymers may include those polymers characterized by a glass transition temperature ($T_g$) of less than 0° C., in other embodiments less than −20° C., and in other embodiments less than −30° C. In one or more embodiments, the rubbery polymer chain exhibits a single glass transition temperature. In particular embodiments, the polymer branches are unsaturated. In these or other embodiments, the polymer branches are capable of being vulcanized to form an elastomeric vulcanizate. In other embodiments, the polymer branches are saturated or substantially saturated, which may result from hydrogenation of the branched polymers.

In one or more embodiments, the branches may include polymers and copolymers including one or more mer units deriving from dienes. In one or more embodiments, the branches include polymers prepared by anionic polymerization. Examples of these polymers include polybutadiene, polyisoprene, poly(styrene-co-butadiene), poly(styrene-co-butadiene-co-isoprene), poly(isoprene-co-styrene), and poly(butadiene-co-isoprene).

In one or more embodiments, the branch points may include a multi-valent atom (e.g., carbon, silicon, phosphorous) or a multi-valent chemical moiety such as a hydrocarbon group. In one or more embodiments, the branch point may include a short hydrocarbon chain, such as carbon chains including from about 1 to about 50, in other embodiments from about 2 to about 20, and in other embodiments from about 3 to about 6 carbon atoms.

Functionalized Branched Polymers

In one or more embodiments, the branched polymers include functionalized-branched polymers. These functionalized-branched polymers include a backbone, a functional group at one end of the backbone, a branch point located at the other end of the backbone, and at least two branches extending from the branch point.

For example, a functionalized-branched polymer of one or more embodiments can be represented by the formula:

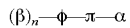

where π is a polymer backbone, φ is a branch point, each β is independently a polymer branch, each n is independently an integer equal to or greater than 2, and α is a functional group.

In one or more embodiments, the polymer backbone of the functionalized-branched polymers may be similar to those described above with respect to the multi-branched polymers.

In one or more embodiments, the polymer branches of the functionalized-branched polymers may be similar to those described above with respect to the multi-branched polymers.

In one or more embodiments, the branch point of the functionalized-branched polymers may be similar to those described above with respect to the multi-branched polymers.

The functional groups may include those groups or substituents that react or interact with rubber or rubber fillers or otherwise have a desirable impact on filled rubber compositions or vulcanizates. Included are those groups that are known to lower hysteresis loss, improve wear, or increase modulus. In one or more embodiments, functional groups include those substituents that reduce the 50° C. hysteresis loss of a carbon black-filled vulcanizate prepared from linear polymers including the functional groups as compared to similar carbon black-filled vulcanizates prepared from linear polymers that do not include the functional group. In one or more embodiments, this reduction is hysteresis loss is at least 5%, in other embodiments at least 10%, and in other embodiments at least 15%. In one or more embodiments, the functional group includes a hetero atom. These hetero atom-bearing substituents include those that may generally be characterized as an electron rich species or a metal-containing species.

Exemplary groups include trialkyl tin substituents, cyclic amine groups, or aryl or alkyl thio acetals. Exemplary trialkyl tin substituents are disclosed in U.S. Pat. No. 5,268,439, which is incorporated herein by reference. Exemplary cyclic amine groups are disclosed in U.S. Pat. Nos. 6,080,853, 5,786,448, 6,025,450, and 6,046,288, which are incorporated herein by reference. Exemplary aryl or alkyl thio acetals (e.g., dithianes) are disclosed in International Publication No. WO 2004/041870, which is incorporated herein by reference.

Random Star-Branched Polymers

In one or more embodiments, the branched polymers include random star-branched polymers. Random star-branched polymers may be referred to as hyperbranched polymers. In one or more embodiments, random star-branched polymers are not easily represented by a single formula, but may be statistical distributions of molecular weights and structures. In one or more embodiments, the random star-branched polymer may include one or more backbones, two or more branches, two or more branch points, and one or more functional groups.

In one or more embodiments, the backbone of the star-branched polymers may be similar to those described above with respect to the multi-branched polymers.

In one or more embodiments, the branches of the star-branched polymer may be similar to those described above with respect to the multi-branched polymers.

In one or more embodiments, the branch points of the star-branched polymer may be similar to those described above with respect to the multi-branched polymers.

In one or more embodiments, the functional group of the star-branched polymer may be similar to those described above with respect to the functionalized branched polymers.

Dendigraft Branched Polymers

In one or more embodiments, the branched polymers include dendrigraft polymers. In general, dendrigraft polymers may exhibit a more ordered structure than random star-branched polymers, but nevertheless dendrigraft polymers are not easily represented by a single formula.

In one or more embodiments, the dendrigraft polymer may include two or more polymer chains connected at one or more graft points by one or more graft moieties. The dendrigraft polymer may further include one or more functional groups.

In one or more embodiments, the polymer chains of the dendrigraft polymer may be similar to the backbones described above with respect to the multi-branched polymers.

In one or more embodiments, the graft moieties of the dendrigraft polymer may be similar to the branches described above with respect to the multi-branched polymers.

In one or more embodiments, the graft points of the dendrigraft polymer may be similar to the branch points described above with respect to the multi-branched polymers.

In one or more embodiments, the functional group of the dendrigraft polymer may be similar to those described above with respect to the functionalized branched polymers.

Preparation of Multi-Branched Polymers

In one or more embodiments, multi-branched polymers can be prepared by reacting a mono-living polymer with a branching agent, thereby forming a branched terminating agent, and then the branched-terminating agent can be reacted with a di-living polymer to form the multi-branched polymer.

In one or more embodiments, mono-living polymers include reactive polymers including a single carbon anion. Mono-living polymers may be prepared by anionic polymerization techniques. These techniques may employ the use of a mono-functional anionic initiator and certain unsaturated monomers to propagate a polymeric structure having a reactive carbon anion at the terminus of the polymer. Throughout formation or propagation of the polymer, the polymeric structure may be referred to as anionic or living. As additional monomer is subsequently added to the reaction, the monomer can add to the living end and thereby increase the degree of polymerization. Anionic polymerization is further described in George Odian, *Principles of Polymerization*, ch. 5 ($3^{rd}$ Ed. 1991), or Panek, 94 J. Am. Chem. Soc., 8768 (1972), which are incorporated herein by reference. Reference to anionically polymerized polymers or anionically polymerized living polymers refers to those polymers prepared by anionic polymerization techniques.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers can be used at a ratio of 95:5 to 50:50, and preferably 95:5 to 65:35.

Any mono-functional initiator can be employed to initiate the formation and propagation of the mono-living polymers. Exemplary mono-functional initiators include, but are not limited to, alkyl lithium initiators such as n-butyl lithium, arenyllithium initiators, and arenylsodium initiators. In one or more embodiments, a functional initiator is employed. In one or more embodiments, functional initiators include those organometal compounds where the organo ligand includes one or more heteroatoms. For example, one class of functional initiators includes aminoalkyllithium compounds such as N-lithiohexamethyleneimide, N-lithiopyrrolidinide, and N-lithiododecamethyleneimide, as well as those disclosed in U.S. Pat. Nos. 5,332,810, 5,329,005, 5,578,542, 5,393,721, 5,698,646, 5,491,230, 5,521,309, 5,496,940, 5,574,109, 5,786,441, which are incorporated herein by reference. Other examples include tin-containing initiators such as alkyl tin lithiums including those disclosed in U.S. Pat. Nos. 3,426,006 and 5,268,439, which are incorporated herein by reference. Still others include alkylthioacetals (e.g. dithianes) and related compounds including those disclosed in U.S. Publications: 2006/0030657, 2006/0264590 and 2006/0264589, which are incorporated herein by reference. Still others include silica-containing initiators such as those described in U.S. Publication 2006/0241241, which is incorporated herein by reference.

In one or more embodiments, the initiator employed imparts a functional group at the head of the polymer chain. The functional group may react or interact with rubber or rubber fillers or otherwise have a desirable impact on filled rubber compositions or vulcanizates. Useful functional groups and the desirable impact on vulcanizates is described above.

The amount of initiator employed in preparing the mono-living polymers vary based upon the desired polymer characteristics. In one embodiment, from about 0.1 to about 100, and in other embodiments from about 0.33 to about 10 mmol of lithium per 100 g of monomer is employed.

Anionic polymerizations may be conducted in a polar solvent such as tetrahydrofuran (THF), or in a nonpolar hydrocarbon such as the various cyclic and acyclic hexanes, heptanes, octanes, pentanes, their alkylated derivatives, and mixtures thereof, as well as benzene.

In order to promote randomization in copolymerization and/or to control vinyl content, a polar coordinator may be added to the polymerization ingredients. These randomizers may be used in amounts between 0 and 90 or more equivalents per equivalent of lithium. The amount may depend on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis(2'-tetrahydrofuryl)propane, di-piperidyl ethane, dipiperidyl methane, hexamethylphosphoramide, N—N'-dimethylpiperazine, diazabicyclooctane, dimethyl ether, diethyl ether, tributylamine and the like. Linear and cyclic oligomeric oxolanyl alkane modifiers are described in U.S. Pat. No. 4,429,091, which is incorporated herein by reference.

Mono-living polymers can be prepared by either batch or continuous methods. A batch polymerization may be begun by charging a blend of monomer(s) and normal alkane solvent to a suitable reaction vessel, followed by the addition of the polar coordinator (if employed) and an initiator compound. The reactants can be heated to a temperature of from about 20 to about 130° C. and the polymerization may be allowed to proceed for from about 0.1 to about 24 hours.

In one or more embodiments, the mono-living polymers may be characterized by a length that is at least 1 times, in other embodiments at least 1.5 times, in other embodiments at least 2 times, in other embodiments at least about 3 times, in other embodiments at least about 4 times, and in other embodiments at least about 5 times the entanglement molecular weight of the mono-living polymers.

In one or more embodiments, useful branching agents include compounds including three or more substituents or moieties that can react with a living polymer (i.e., react with the carbanion of a living polymer). In one or more embodiments, these substituents or moieties can include leaving groups or addition groups.

For example, a branching agent of one or more embodiments can be defined by the formula

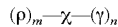

where ρ includes a group or moiety that is non-reactive with respect to a living polymer, χ is a multi-valent atom or multi-valent moiety, each γ is individually a group that can react with a living polymer, n is an integer of at least 3, and m is 0 or an integer greater than 0. In one or more embodiments, n is an integer from 3 to about 6, and in other embodiments from about 3 to about 4. In one or more embodiments, a group that can react with a living polymer includes a leaving group or moiety including a leaving group.

Leaving groups may include those substituents that can be displaced by a nucleophilic compound. In one or more embodiments, leaving groups include those substituents that will react or associate with the counter-cation of a living polymer (e.g., Li$^+$) and thereby form a stable or neutral compound. Exemplary leaving groups, or groups that include leaving groups, include halides, thioalkoxides, alkoxides, dialkylamines, and mixtures thereof. Examples of alkoxide groups include methoxy and ethoxy groups. Leaving groups include cyclic leaving groups, which can be self-contained (i.e., the group opens).

In one or more embodiments, addition groups may include those substituents that will undergo an addition reaction with a nucleophilic compound. In one or more embodiments, the addition group will react or associate with the living anionic portion (e.g., —C$^-$) of a living polymer. In one or more embodiments, addition groups include nitriles such as cyano groups, alkyl or alkenyl nitriles, Schiff bases (e.g., RR'C═NR"), ketone groups, aldehyde groups, or ester groups.

In one or more embodiments, multi-valent atoms may include Group 13, Group 14, or Group 15 atoms. In one or more embodiments, the multi-valent atoms include carbon, silicon, germanium, tin, or lead. In one or more embodiments, multi-valent moieties include hydrocarbyl groups such as hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms.

In one or more embodiments, groups or substituents that are non-reactive with respect to living polymers may include hydrocarbyl groups or substituted hydrocarbyl groups such as, but not limited to hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms.

Examples of useful branching agents include tin tetrachloride and silicon tetrachloride.

In one or more embodiments, di-living polymers include reactive polymers including two carbon anions. Di-living polymers may be prepared by anionic polymerization techniques. These techniques may employ use of a di-functional anionic initiator and certain unsaturated monomers to propagate a polymeric structure having a reactive carbon anion at two distinct termini of the polymer. Use of multi-functional initiators in anionic polymerization is described in U.S. Pat. No. 3,652,516, which is incorporated herein by reference. Exemplary, di-lithio initiators include those prepared by reacting 1,3-diisopropenylbenzene with sec-butyl lithium. In other embodiments, di-living polymers may be prepared by employing a radical-anion initiators. The use of these initiators is described in U.S. Pat. No. 5,552,483, which is incorporated herein by reference. In one embodiment, the radical anion polymerization technique employs a naphthalene anion-radical that is believed to transfer an electron to a monomer such as styrene to form a styryl radical-anion. The naphthalene anion-radical can be formed by reacting an alkali metal, such as sodium, with naphthalene. In one or more embodiments, the styryl radical-anion dimerizes to form a dicarbanion. It is believed that the addition of additional monomer converts the dicarbanion to a di-living polymer. As with the mono-living polymer, the polymeric structure may be referred to as anionic or living throughout formation or propagation of the polymer. As additional monomer is subsequently added to the reaction, the monomer can add to the living end and thereby increase the degree of polymerization.

The amount of initiator employed in preparing the di-living polymers vary based upon the desired polymer characteristics. In one embodiment, from about 0.2 to about 200, and in other embodiments from about 0.66 to about 20 mmol of lithium per 100 g of monomer is employed.

In one or more embodiments, the amount of mono-living polymer reacted with the branching agent can be expressed in terms of the moles of mono-living polymer (e.g., the equivalents of lithium associated with living polymer) and the equivalents of reactive sites on the branching agent (e.g., equivalents of chlorine on tin tetrachloride). For example, in one embodiment, where the number of reactive sites on the branching agent can be defined by the variable n, the number of moles of mono-living polymer reacted with the branching agent may be from n minus 0.5 to about n minus 1.5, in other embodiments from about n minus 0.7 to about n minus 1.4, and in other embodiments from about n minus 1.1 to about n minus 1.3.

In one or more embodiments, the amount of branched-terminating agent reacted with the di-living polymer may be expressed in terms of the number of moles of branched terminating agent to the number of moles of di-living polymer. For example, in one embodiment, from about 1.5 to about 2.5 moles of branched terminating agent may be reacted with a mole of di-living polymer, in other embodiments from about 1.5 to about 10 moles of branched terminating agent may be reacted with a mole of di-living polymer, and in other embodiments from about 1.6 to a bout 2.5 moles of branched terminating agent may be reacted with a mole of di-living polymer.

In one or more embodiments, the reaction between the mono-living polymer and the branching agent may occur in solution at standard conditions. In these or other embodiments, the solution may be under an inert atmosphere.

In one or more embodiments, the solution in which the branched terminating agent may be formed may include a solvent. Useful solvents may include those solvents in which the mono-living polymer, the branching agent, and/or the branched terminating agent may be at least partially soluble. Exemplary solvents include polar solvents such as tetrahydrofuran or non-polar hydrocarbon solvents such as cyclic and acyclic hexanes, heptanes, octanes, pentanes, their alkylated derivatives, and mixtures thereof. Other non-polar hydrocarbon solvents that may be used include aromatic solvents such as benzene.

In one or more embodiments, the reaction between the mono-living polymer and the branching agent occurs within the same solution in which the mono-living polymer was prepared. In other words, the branching agent is added to the medium in which the mono-living polymer was prepared. In one or more embodiments, the branching agent may be added to the polymerization medium after a peak polymerization temperature has been achieved with respect to the synthesis of the mono-living polymer.

In one or more embodiments, the reaction between the mono-living polymer and the branching agent may occur at temperature of from about −70° C. to about 100° C., and in other embodiments, from about 0° C. to about 50° C. In one or more embodiments, the reaction medium may be maintained under an inert atmosphere such as nitrogen or argon.

In one or more embodiments, the branched terminating agent and the di-living polymer may be combined under conditions similar to those employed for combining the mono-living polymer and the branching agent. In one or more embodiments, the branched terminating agent is added to a solution containing the di-living polymer. The solution to which the branched terminating agent is added may be the solution in which the di-living polymer was synthesized.

Preparation of Functionalized-Branched Polymers

In one or more embodiments, functionalized-branched polymers can be prepared by reacting a branching agent, such as that described above, with a mixture of living polymer, where the mixture includes a plurality of living polymer and a plurality of non-functional living polymer (i.e. living polymer without a functional group). The plurality of living polymer including a functional group may be referred to as a first plurality of polymer, and the plurality of living polymer without the functional group may be referred to as the second plurality of living polymer.

In one or more embodiments, the first plurality of living polymers may be characterized by a length that is at least 2.5 times, in other embodiments at least 3 times, in other embodiments at least about 4 times, in other embodiments at least 5 times, and in other embodiments at least about 6 times the entanglement molecular weight of the polymer.

In these or other embodiments, the first plurality of living polymer includes a functional group. In one or more embodiments, the functional group may include the residue of a functionalized initiator. As a result, the functional group of one or more embodiments may be positioned at the head of the living polymer chain. The functional group may include a group or substituents that may react or interact with rubber or rubber fillers or otherwise have a desirable impact on filled rubber compositions or vulcanizates. These groups include those described above with respect to the functionalized-branched polymer.

In one or more embodiments, the second plurality of living polymer may be characterized by a length that is at least 1 times, in other embodiments at least 1.5 times, in other embodiments at least 2 times, in other embodiments at least 3 times, in other embodiments at least 4 times, and in other embodiments at least 5 times the entanglement molecular weight of the living polymer.

In one or more embodiments, the second plurality of living polymer are non-functional. In other words, the living polymers are devoid functional groups as defined herein.

In one or more embodiments, the mixture of living polymer can be prepared by first initiating the polymerization of anionically-polymerizable monomer with a functionalized initiator. The polymerization may be allowed to proceed to an extent where the functionalized living polymer is characterized by a desirable length (e.g. a length of at least four times the entanglement molecular weight), thereby resulting in a living polymer cement (i.e. polymer solution) including functionalized polymer having a desired degree of polymerization. Once the desired degree of polymerization has been achieved, non-functional anionic polymerization initiator can be added to the polymer cement, thereby initiating non-functional polymer chains. In one or more embodiments, additional anionically-polymerizable monomer can be added to the polymer cement.

In one or more embodiments, functionalized anionic polymerization initiators include arenyllithium initiators, arenylsodium initiators, N-lithium dihydro-carbon amides, aminoalkyllithiums, alkyl tin lithiums, cyclic amines, and sulfur-containing heterocycles. Examples of functionalized initiators include N-lithiohexamethyleneimide, N-lithiopyrrolidinide, and N-lithiododecamethyleneimide as well as organolithium compounds such as the tri-alkyl lithium adducts of substituted aldimines and substituted ketimines, 2-lithio-2-methyl-1,3-dithiane and N-lithio salts of substituted secondary amines. Exemplary initiators are also described in the following U.S. Pat. Nos. 5,332,810, 5,329, 005, 5,578,542, 5,393,721, 5,698,646, 5,491,230, 5,521,309, 5,496,940, 5,574,109, 5,786,441, U.S. Provisional Application No. 60/683,152, and International Publication No. WO 2004/020475, which are incorporated herein by reference.

Preparation of Random Star Branched Polymers

In one or more embodiments, random star-branched polymer may be prepared by providing a free-radical source to a composition including branched polymers.

In one or more embodiments, branched polymers, which may also be referred to as star polymers, include at least one branch point and at least three branches extending from the at least one branch point.

The branch point may include a multi-valent atom (e.g., carbon, silicon, phosphorous) or a multi-valent chemical moiety such as a hydrocarbon group. In one or more embodiments, the branch point may include a short hydrocarbon chain, such as carbon chains including from about 1 to about 50, in other embodiments from about 2 to about 20, and in other embodiments from about 3 to about 6 carbon atoms.

In one or more embodiments, the branches of the star polymers may be characterized by a length that is at least about 1 times, in other embodiments at least 1.5 times, in other embodiments at least 2 times, in other embodiments at least about 3 times, in other embodiments at least about 4 times, and in yet other embodiments at least about 5 times the entanglement molecular weight of the branches.

In one or more embodiments, the branches of the star polymers may be characterized as rubbery polymers. Rubbery polymers may include those polymers characterized by a glass transition temperature ($T_g$) of less than 0° C., in other embodiments less than −20° C., and in other embodiments less than −30° C. In one or more embodiments, the rubbery polymer chain exhibits a single glass transition temperature.

In one or more embodiments, the branches of the star polymers may include polymers and copolymers including one or more mer units deriving from dienes. In one or more embodiments, the branches of the star polymers are prepared by anionic polymerization. Examples of these polymers include polybutadiene, polyisoprene, poly(styrene-co-butadiene), poly(styrene-co-butadiene-co-isoprene), poly(isoprene-co-styrene), and poly(butadiene-co-isoprene).

Practice of this invention is not necessarily limited by the selection of a particular free radical source. In one or more embodiments, the free radical source may include an electron beam. In other embodiments, the free radical source may include a chemical compound that can be activated to provide a free radical. These compounds, which may also be referred to as free radical initiators, may include free radical initiators such as peroxide and azo compounds, which are believed to accelerate the polymerization of the vinyl aromatic monomer. Exemplary initiators include, but are not limited to, tertiary butyl peroxyacetate, dibenzoyl peroxide, dilauroyl peroxide, t-butylhydroperoxide, ditertiary-butylperoxide, cumene hydroperoxide, dicumylperoxide, 1,1-bis(tertiary-butylperoxy)-3,3,5-trimethyl-cyclohexane, t-butylperoxybenzoate, 1,1-bis(t-butylperoxy)-cyclohexane, benzoylperoxide, succinoylperoxide and t-butylperoxypivilate, and azo compounds such as azobisisobutyro-nitrile, azobis-2,4-dimethylvaleronitrile, azobiscyclohexanecarbo-nitrile, azobismethyl isolactate and azobiscyanovalerate. Typical amounts are well known in the art and may be used in the process of the present invention. In one or more embodiments, the amount added less than that amount that will gel the polymer. In one or more embodiments, the amount is sufficient to couple at least 10 weight percent of the polymer up to about 90 weight percent of the polymer. In one or more embodiments, the amount added is sufficient to couple from about 20 weight percent to about 30 weight percent of the polymer.

In one or more embodiments, the star polymer and the free radical source are introduced in a solvent. For example, the star polymer may be dissolved or suspended in a solvent to form a polymer solution or cement, and the free radial source can be introduced to the polymer solution. Useful solvents include polar and non-polar organic solvents such as hydrocarbon solvents.

The star polymer and the free radical source can be contacted by mixing or blending. This may take place by employing conventional equipment and/or conventional techniques such as continuously stirred tank reactors.

Preparation of Dendigraft Branched Polymers

In one or more embodiments, multi-branched dendrigraft polymers may be prepared by reacting a living polymer with a grafting agent and a chain transfer agent.

Living polymers may be prepared by any of the anionic polymerization techniques described hereinabove for multi-branched polymers. In one or more embodiments, the living polymer may be characterized by a length that is at least 2 times the entanglement molecular weight of the living polymer.

In one or more embodiments, the living polymer is combined sequentially or simultaneously with a grafting agent and a chain transfer agent. In certain embodiments, the grafting agent is added incrementally. In these or other embodiments, the chain transfer agent is added incrementally. In one or more embodiments, additional monomer may optionally be added to the polymerization medium.

In one or more embodiments, the grafting agent includes a multifunctional monomer. In one or more embodiments, the multifunctional monomer includes two or more functional groups capable of reacting with the living polymer chains. In one embodiment, the multifunctional monomer may react with the living polymer chain through an addition reaction at a site on the living polymer chain having a double bond. In another embodiment, the multifunctional monomer may react with the living polymer through a substitution reaction. Examples of multifunctional monomers include chloromethylstyrene, divinylbenzene, ethylene glycol dimethacrylate, diethylene glycol dimethacrylate, triethylene glycol dimethacrylate, 1,3-butylene glycol dimethacrylate, arylmethacrylate, and 1,3-butylene glycol diacrylate.

Examples of chain transfer agents include mercaptans such as 2,4,4-trimethylpentane-2-thiol, 2,2,4,6,6-pentamethyl-heptane-4-thiol, 2,2,4,6,6,8,8-heptamethylnonane-4-thiol, t-dodecyl mercaptan and t-tetradecyl mercaptan, xanthogen disulfides such as dimethylxanthogen disulfide, diethylxanthogen disulfide and diisopropylxanthogen disulfide, thiuram disulfides such as tetramethylthiuram disulfide, tetraethylthiuram disulfide and tetrabutylthiuram disulfide, halogenated hydrocarbons such as carbon tetrachloride and ethylene bromide, hydrocarbons such as pentaphenylethane; and terpinolene, α-terpinene, γ-terpinene, dipentene, α-methylstyrene dimmer, and 2,5-dihydrofuran. In one or more embodiments, amines, such as secondary amines, are employed. These chain transfer agents may be used either alone or in combination.

In one or more embodiments, the amount of grafting agent may be expressed relative to the amount of living polymer. In one embodiment, the ratio of grafting agent to living polymer is from 0.1 to 1 to about 2 to 1.

In one or more embodiments, the amount of chain transfer agent may be expressed relative to the amount of grafting agent. In one embodiment, the ratio of chain transfer agent to grafting agent is from about 0.25 to 1 to about 2 to 1.

In one or more embodiments, the reaction between the living polymer and the grafting agent may occur in solution at standard conditions. In these or other embodiments, the solution may be under an inert atmosphere.

In one or more embodiments, the solution in which the dendrigraft polymer may be formed may include a solvent. Useful solvents may include those solvents in which the living polymer, the grafting agent, and/or the chain transfer agent may be at least partially soluble. Exemplary solvents include polar solvents such as tetrahydrofuran or non-polar hydrocarbon solvents such as cyclic and acyclic hexanes, heptanes, octanes, pentanes, their alkylated derivatives, and mixtures thereof. Other non-polar hydrocarbon solvents that may be used include aromatic solvents such as benzene.

In one or more embodiments, the reaction between the living polymer, chain transfer agent, and the grafting agent occurs within the same solution in which the living polymer was prepared. In other words, the grafting agent and chain transfer agent are added to the medium in which the living polymer was prepared. The chain transfer agent and grafting agent may be added simultaneously or sequentially. One or both of the chain transfer agent and grafting agent may be added incrementally. In one or more embodiments, the grafting agent and/or chain transfer agent may be added to the polymerization medium after a peak polymerization temperature has been achieved with respect to the synthesis of the mono-living polymer.

In one or more embodiments, the reaction between the living polymer, chain transfer agent, and the grafting agent may occur at temperature of from about −70° C. to about 100° C., and in other embodiments, from about 0° C. to about 50° C. In one or more embodiments, the reaction medium may be maintained under an inert atmosphere such as nitrogen or argon.

Branched Polymers by Coupling High-cis-Polydienes

In yet another embodiment, useful branched polymers can be prepared by synthesizing particular branched polymers and treating these branched polymers with free radical source to induce additional coupling or branching. In one or more embodiments, these particular branched polymers are prepared by employing a lanthanide-based catalyst system, and the treatment of the polymer with a free radial source occurs though peroxide introduced to the polymer. In particular embodiments, the polymer is treated with peroxide while in solution.

The lanthanide-based catalyst system employed to prepare the polymers that are to be treated with the peroxide include a nickel co-catalyst as described in U.S. Pat. No. 6,699,813, which is incorporated herein by reference.

In one embodiment, the catalyst composition is formed by combining (a) a lanthanide compound, (b) an alkylating agent, (c) a nickel-containing compound, and (d) a halogen-containing compound. Where the lanthanide compound, alkylating agent, or nickel-containing compound contains a labile halogen atom, the need for an additional compound containing a labile halogen atom is optional. Therefore, the catalyst system may be formed by combining (a) a lanthanide compound, (b) an alkylating agent, and (c) a nickel-containing compound, with the proviso that at least one of the lanthanide compound, the alkylating agent, or the nickel-containing compound includes a labile halogen atom. In addition to the catalyst ingredients (a), (b), (c), and (d), other organometallic compounds or Lewis bases can also be added, if desired.

The catalyst system may be combined with conjugated diene monomer to prepare high-cis polydienes by using conventional procedures. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

Various lanthanide compounds or mixtures thereof can be employed as ingredient (a) of the catalyst composition. Preferably, these compounds are soluble in hydrocarbon solvents such as aromatic hydrocarbons, aliphatic hydrocarbons, or cycloaliphatic hydrocarbons. Hydrocarbon-insoluble lanthanide compounds, however, can be suspended in the polymerization medium to form the catalytically active species and are also useful.

Lanthanide compounds include at least one atom of lanthanum, neodymium, cerium, praseodymium, promethium, samarium, europium, gadolinium, terbium, dysprosium, holmium, erbium, thulium, ytterbium, lutetium, and didymium. Preferably, these compounds include neodymium, lanthanum, samarium, or didymium. Didymium is a commercial mixture of rare-earth elements obtained from monazite sand.

The lanthanide atom in the lanthanide compounds can be in various oxidation states including but not limited to the 0, +2, +3, and +4 oxidation states. Trivalent lanthanide compounds, where the lanthanide atom is in the +3 oxidation state, are preferred. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Because neodymium compounds are most advantageously employed, further discussion will focus on neodymium compounds, although those skilled in the art will be able to select similar compounds that are based upon other lanthanide metals.

Suitable neodymium carboxylates include neodymium formate, neodymium acetate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate, neodymium naphthenate, neodymium stearate, neodymium oleate, neodymium benzoate, and neodymium picolinate.

Suitable neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl)phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl (2-ethylhexyl)phosphate, neodymium(1-methylheptyl) (2-ethylhexyl)phosphate, and neodymium(2-ethylhexyl) (p-nonylphenyl)phosphate.

Suitable neodymium organophosphonates include neodymium butyl phosphonate, neodymium pentyl phosphonate, neodymium hexyl phosphonate, neodymium heptyl phosphonate, neodymium octyl phosphonate, neodymium(1-methylheptyl)phosphonate, neodymium(2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium(p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium(1-methylheptyl) (1-methylheptyl)phosphonate, neodymium(2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium(p-nonylphenyl) (p-nonylphenyl)phosphonate, neodymium butyl (2-ethylhexyl)phosphonate, neodymium (2-ethylhexyl)butylphosphonate, neodymium(1-methylheptyl) (2-ethylhexyl)phosphonate, neodymium(2-ethylhexyl) (1-methylheptyl)phosphonate, neodymium(2-ethylhexyl) (p-nonylphenyl)phosphonate, and neodymium(p-nonylphenyl) (2-ethylhexyl)phosphonate.

Suitable neodymium organophosphinates include neodymium butylphosphinate, neodymium pentylphosphinate, neodymium hexylphosphinate, neodymium heptylphosphinate, neodymium octylphosphinate, neodymium(1-methylheptyl)phosphinate, neodymium(2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl) phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl (2-ethylhexyl)phosphinate, neodymium(1-methylheptyl) (2-ethylhexyl)phosphinate, and neodymium(2-ethylhexyl) (p-nonylphenyl)phosphinate.

Suitable neodymium carbamates include neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include neodymium methylxanthate, neodymium ethylxanthate, neodymium isopropylxanthate, neodymium butylxanthate, and neodymium benzylxanthate.

Suitable neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include neodymium fluoride, neodymium chloride, neodymium bromide, and neodymium iodide. Suitable neodymium pseudo-halides include neodymium cyanide, neodymium cyanate, neodymium thiocyanate, neodymium azide, and neodymium ferrocyanide. Suitable neodymium oxyhalides include neodymium oxyfluoride, neodymium oxychloride, and neodymium oxybromide. Where neodymium halides, neodymium oxyhalides, or other neodymium compounds containing labile halogen atoms are employed, the neodymium-containing compound can serve as both the lanthanide compound as well as the halogen-containing compound. A Lewis base such as tetrahydrofuran (THF) may be employed as an aid for solubilizing this class of neodymium compounds in inert organic solvents.

The term organolanthanide compound refers to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Various alkylating agents, or mixtures thereof, can be used as component (b) of the catalyst composition. Alkylating agents, which may also be referred to as hydrocarbylating agents, are organometallic compounds that can transfer hydrocarbyl groups to another metal. Typically, these agents are organometallic compounds of electropositive metals such as Groups 1, 2, and 3 metals (Groups IA, IIA, and IIIA metals). Preferred alkylating agents include organoaluminum and organomagnesium compounds. Where the alkylating agent includes a labile halogen atom, the alkylating agent may also serve as the halogen-containing compound.

The term "organoaluminum compound" refers to any aluminum compound containing at least one aluminum-carbon bond. Organoaluminum compounds that are soluble in a hydrocarbon solvent are preferred. Where the alkylating agent is an organoaluminum compound that includes a labile halogen atom, the organoaluminum compound can serve as both the alkylating agent and the halogen-containing compound.

A preferred class of organoaluminum compounds that can be utilized is represented by the general formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. Preferably, each R is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms.

Suitable organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. Trihydrocarbylaluminum, dihydrocarbylaluminum hydride, and hydrocarbylaluminum dihydride compounds are preferred.

Suitable trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of suitable organoaluminum compounds is aluminoxanes. Aluminoxanes comprise oligomeric linear aluminoxanes that can be represented by the general formula:

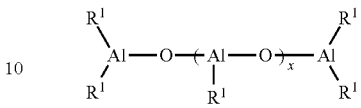

And oligomeric cyclic aluminoxanes that can be represented by the general formula:

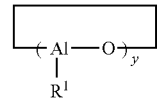

where x is an integer of 1 to about 100, preferably about 10 to about 50; y is an integer of 2 to about 100, preferably about 3 to about 20; and where each $R^1$, which may be the same or different, is a mono-valent organic group that is attached to the aluminum atom via a carbon atom. Preferably, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

Suitable aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Isobutylaluminoxane is particularly useful on the grounds of its availability and its solubility in aliphatic and cycloaliphatic hydrocarbon solvents. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one preferred embodiment, methyl aluminoxane and diisobutyl aluminum hydride are employed in combination.

The term organomagnesium compound refers to any magnesium compound that contains at least one magnesium-carbon bond. Organomagnesium compounds that are soluble in a hydrocarbon solvent are preferred. A preferred class of organomagnesium compounds that can be utilized is represented by the general formula $MgR^2{}_2$, where each $R^2$, which may be the same or different, is a mono-valent organic group, with the proviso that the group is attached to the magnesium atom via a carbon atom. Preferably, each $R^2$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atom.

Some specific examples of suitable dihydrocarbylmagnesium compounds that can be utilized include diethylmagnesium, di-n-propylmagnesium, diisopropylmagnesium, dibutylmagnesium, dihexylmagnesium, diphenylmagnesium, dibenzylmagnesium, and mixtures thereof. Dibutylmagnesium is particularly useful due to its availability and its solubility in aliphatic and cycloaliphatic hydrocarbon solvents.

Another class of organomagnesium compounds that can be utilized as ingredient (b) is represented by the general formula $R^3MgX$, where $R^3$ is a mono-valent organic group, with the proviso that the group is attached to the magnesium atom via a carbon atom, and X is a hydrogen atom, a halogen atom, a carboxylate group, an alkoxide group, or an aryloxide group. Where the alkylating agent is an organomagnesium compound that includes a labile halogen atom, the organomagnesium compound can serve as both the alkylating agent and the halogen-containing compound. Preferably, $R^3$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. Preferably, X is a carboxylate group, an alkoxide group, or an aryloxide group, with each group preferably containing 1 to 20 carbon atoms.

Some suitable types of organomagnesium compounds that are represented by the general formula $R^3MgX$ include, but are not limited, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Some specific examples of suitable organomagnesium compounds that are represented by the general formula $R^3MgX$ include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Various nickel-containing compounds or mixtures thereof can be employed as ingredient (c) of the catalyst composition. Preferably, these nickel-containing compounds are soluble in hydrocarbon solvents such as aromatic hydrocarbons, aliphatic hydrocarbons, or cycloaliphatic hydrocarbons. Hydrocarbon-insoluble nickel-containing compounds, however, can be suspended in the polymerization medium to form the catalytically active species and are also useful.

The nickel atom in the nickel-containing compounds can be in various oxidation states including but not limited to the 0, +2, +3, and +4 oxidation states. Divalent nickel compounds, where the nickel atom is in the +2 oxidation state, are preferred. Suitable nickel-containing compounds include, but are not limited to, nickel carboxylates, nickel organophosphates, nickel organophosphonates, nickel organophosphinates, nickel carbamates, nickel dithiocarbamates, nickel xanthates, nickel β-diketonates, nickel alkoxides or aryloxides, nickel halides, nickel pseudo-halides, nickel oxyhalides, and organonickel compounds.

Suitable nickel carboxylates include nickel octoate, nickel formate, nickel acetate, nickel acetate, nickel acrylate, nickel methacrylate, nickel valerate, nickel gluconate, nickel citrate, nickel fumarate, nickel lactate, nickel maleate, nickel oxalate, nickel 2-ethylhexanoate, nickel neodecanoate, nickel naphthenate, nickel stearate, nickel oleate, nickel benzoate, and nickel picolinate.

Suitable nickel organophosphates include nickel dibutyl phosphate, nickel dipentyl phosphate, nickel dihexyl phosphate, nickel diheptyl phosphate, nickel dioctyl phosphate, nickel bis(1-methylheptyl)phosphate, nickel bis(2-ethylhexyl)phosphate, nickel didecyl phosphate, nickel didodecyl phosphate, nickel dioctadecyl phosphate, nickel dioleyl phosphate, nickel diphenyl phosphate, nickel bis(p-nonylphenyl) phosphate, nickel butyl (2-ethylhexyl)phosphate, nickel(1-methylheptyl) (2-ethylhexyl)phosphate, and nickel(2-ethylhexyl) (p-nonylphenyl)phosphate.

Suitable nickel organophosphonates include nickel butyl phosphonate, nickel pentyl phosphonate, nickel hexyl phosphonate, nickel heptyl phosphonate, nickel octyl phosphonate, nickel(1-methylheptyl)phosphonate, nickel(2-ethylhexyl)phosphonate, nickel decyl phosphonate, nickel dodecyl phosphonate, nickel octadecyl phosphonate, nickel oleyl phosphonate, nickel phenyl phosphonate, nickel(p-nonylphenyl)phosphonate, nickel butyl butylphosphonate, nickel pentyl pentylphosphonate, nickel hexyl hexylphosphonate, nickel heptyl heptylphosphonate, nickel octyl octylphosphonate, nickel(1-methylheptyl) (1-methylheptyl)phosphonate, nickel(2-ethylhexyl) (2-ethylhexyl)phosphonate, nickel decyl decylphosphonate, nickel dodecyl dodecylphosphonate, nickel octadecyl octadecylphosphonate, nickel oleyl oleylphosphonate, nickel phenyl phenylphosphonate, nickel (p-nonylphenyl) (p-nonylphenyl)phosphonate, nickel butyl (2-ethylhexyl)phosphonate, nickel(2-ethylhexyl)butylphosphonate, nickel(1-methylheptyl) (2-ethylhexyl)phosphonate, nickel(2-ethylhexyl) (1-methylheptyl)phosphonate, nickel (2-ethylhexyl) (p-nonylphenyl)phosphonate, and nickel(p-nonylphenyl) (2-ethylhexyl)phosphonate.

Suitable nickel organophosphinates include nickel butylphosphinate, nickel pentylphosphinate, nickel hexylphosphinate, nickel heptylphosphinate, nickel octylphosphinate, nickel(1-methylheptyl)phosphinate, nickel(2-ethylhexyl)phosphinate, nickel decylphosphinate, nickel dodecylphosphinate, nickel octadecylphosphinate, nickel oleylphosphinate, nickel phenylphosphinate, nickel(p-nonylphenyl)phosphinate, nickel dibutylphosphinate, nickel dipentylphosphinate, nickel dihexylphosphinate, nickel diheptylphosphinate, nickel dioctylphosphinate, nickel bis(1-methylheptyl)phosphinate, nickel bis(2-ethylhexyl)phosphinate, nickel didecylphosphinate, nickel didodecylphosphinate, nickel dioctadecylphosphinate, nickel dioleylphosphinate, nickel diphenylphosphinate, nickel bis(p-nonylphenyl)phosphinate, nickel butyl(2-ethylhexyl)phosphinate, nickel(1-methylheptyl)(2-ethylhexyl)phosphinate, and nickel(2-ethylhexyl) (p-nonylphenyl)phosphinate.

Suitable nickel carbamates include nickel dimethylcarbamate, nickel diethylcarbamate, nickel diisopropylcarbamate, nickel dibutylcarbamate, and nickel dibenzylcarbamate.

Suitable nickel dithiocarbamates include nickel dimethyldithiocarbamate, nickel diethyldithiocarbamate, nickel diisopropyldithiocarbamate, nickel dibutyldithiocarbamate, and nickel dibenzyldithiocarbamate.

Suitable nickel xanthates include nickel methylxanthate, nickel ethylxanthate, nickel isopropylxanthate, nickel butylxanthate, and nickel benzylxanthate.

Suitable nickel β-diketonates include nickel acetylacetonate, nickel trifluoroacetylacetonate, nickel hexafluoroacetylacetonate, nickel benzoylacetonate, and nickel 2,2,6,6-tetramethyl-3,5-heptanedionate.

Suitable nickel alkoxides or aryloxides include nickel methoxide, nickel ethoxide, nickel isopropoxide, nickel 2-ethylhexoxide, nickel phenoxide, nickel nonylphenoxide, and nickel naphthoxide.

Suitable nickel halides include nickel fluoride, nickel chloride, nickel bromide, and nickel iodide. Suitable nickel pseudo-halides include nickel cyanide, nickel cyanate, nickel thiocyanate, nickel azide, and nickel ferrocyanide. Suitable nickel oxyhalides include nickel oxyfluoride, nickel oxychloride and nickel oxybromide. Where nickel halides, nickel oxyhalides, or other nickel compounds containing labile halogen atoms are employed, the nickel-containing compound can serve as both a molecular weight regulator as well as the halogen-containing compound. A Lewis base such as an alcohol can be used as a solubility aid for this class of compounds.

The term organonickel compound refers to any nickel compound containing at least one nickel-carbon bond. Suitable organonickel compounds include bis(cyclopentadienyl)nickel (also called nickelocene), bis(pentamethylcyclopentadienyl)nickel (also called decamethylnickelocene), bis(tetramethylcyclopentadienyl)nickel, bis(ethylcyclopentadienyl)nickel, bis(isopropylcyclopentadienyl)nickel, bis(pentadienyl)nickel, bis(2,4-dimethylpentadienyl)nickel, (cyclopentadienyl)(pentadienyl)nickel, bis(1,5-cyclooctadiene)nickel, bis(allyl)nickel, bis(methallyl)nickel, and bis(crotyl)nickel.

Various compounds, or mixtures thereof, that contain one or more labile halogen atoms can be employed as ingredient (d) of the catalyst composition. These compounds may simply be referred to as halogen-containing compounds. Examples of halogen atoms include, but are not limited to, fluorine, chlorine, bromine, and iodine. A combination of two or more halogen atoms can also be utilized. Halogen-containing compounds that are soluble in a hydrocarbon solvent are preferred. Hydrocarbon-insoluble halogen-containing compounds, however, can be suspended in the oligomerization medium to form the catalytically active species, and are therefore useful.

Useful types of halogen-containing compounds include, but are not limited to, elemental halogens, mixed halogens, hydrogen halides, organic halides, inorganic halides, metallic halides, organometallic halides, and mixtures thereof.

Suitable elemental halogens include fluorine, chlorine, bromine, and iodine. Some specific examples of suitable mixed halogens include iodine monochloride, iodine monobromide, iodine trichloride, and iodine pentafluoride.

Suitable hydrogen halides include hydrogen fluoride, hydrogen chloride, hydrogen bromide, and hydrogen iodide.

Suitable organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Suitable inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Suitable metallic halides include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Suitable organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

The catalyst composition of this invention has very high catalytic activity for polymerizing conjugated dienes into stereospecific polydienes over a wide range of catalyst concentrations and catalyst ingredient ratios. The polymers having the most desirable properties, however, are obtained within a narrower range of catalyst concentrations and catalyst ingredient ratios. Further, it is believed that the catalyst ingredients (a), (b), (c), and (d) may interact to form an active catalyst species. Accordingly, the optimum concentration for any one catalyst ingredient is dependent upon the concentrations of the other catalyst ingredients. The molar ratio of the nickel-containing compound to the lanthanide compound (Ni/Ln) can be varied from about 0.001:1 to about 1:1, more preferably from about 0.005:1 to about 0.5:1, and even more preferably from about 0.01:1 to about 0.2:1. The molar ratio of the alkylating agent to the lanthanide compound (alkylating agent/Ln) can be varied from about 1:1 to about 200:1, more preferably from about 2:1 to about 100:1, and even more preferably from about 5:1 to about 50:1. The molar ratio of the halogen-containing compound to the lanthanide compound (halogen atom/Ln) can be varied from about 0.5:1 to about 20:1, more preferably from about 1:1 to about 10:1, and even more preferably from about 2:1 to about 6:1. The term molar ratio, as used herein, refers to the equivalent ratio of relevant components of the ingredients, e.g., equivalents of halogen atoms on the halogen-containing compound to lanthanide atoms on the lanthanide compound.

In another embodiment, the catalyst composition comprises (a) a lanthanide compound, (b) an aluminoxane, and (c) a nickel-containing compound, with the proviso that the molar ratio of the aluminoxane to the lanthanide compound (Al/Ln) is from about 50:1 to about 50,000:1, preferably from about 75:1 to about 30,000:1, and more preferably from about 100:1 to about 1,000:1, where the molar ratio refers to equivalents of aluminum atoms on the aluminoxane to equivalents of lanthanide atoms in the lanthanide compound. Useful lanthanide compounds, aluminoxanes, and nickel-containing compounds are described above.

In yet another embodiment, the catalyst composition of the present invention comprises (a) a lanthanide compound, (b) an alkylating agent, (c) a nickel-containing compound, and (d) a non-coordinating anion or non-coordinating anion precursor. Useful lanthanide compounds, alkylating agents, and nickel-containing compounds are described above. Useful molar ratios of non-coordinating anion or non-coordinating anion precursor to lanthanide compound (An/Ln) include from about 0.5:1 to about 20:1, preferably from about 0.75:1 to about 10:1, and more preferably from about 1:1 to about 6:1.

Compounds containing non-coordinating anions are known in the art. In general, non-coordinating anions are sterically bulky anions that do not form coordinate bonds with, for example, the active center of a catalyst system, due to steric hindrance. Exemplary non-coordinating anions include tetraarylborate anions, and fluorinated tetraarylborate anions. Compounds containing a non-coordinating anion also contain a counter cation such as a carbonium, ammonium, or phosphonium cation. Exemplary counter cations include triarylcarbonium cations and N,N-dialkylanilinium cations. Examples of compounds containing a non-coordinating anion and a counter cation include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

Non-coordinating anion precursors include compounds that can form a non-coordinating anion under reaction conditions. Exemplary non-coordinating anion precursors include triarylboron compounds, $BR_3$, where R is a strong electron-withdrawing aryl group such as a pentafluorophenyl or 3,5-bis(trifluoromethyl)phenyl group.

The catalyst composition is formed by combining or mixing the catalyst ingredients (a), (b), (c), and (d). Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition of this invention can be formed by using one of the following methods.

First, the catalyst composition may be formed in situ by adding the catalyst ingredients to a solution containing monomer and solvent, or simply bulk monomer, in either a stepwise or simultaneous manner. When adding the catalyst ingredients in a stepwise manner, the sequence in which the catalyst ingredients are added is not critical. Preferably, however, the alkylating agent is added first, followed by the lanthanide compound, followed by the nickel-containing compound, and then followed by the halogen-containing compound, if used, or by the non-coordinating anion or non-coordinating anion precursor.

Second, the catalyst ingredients may be pre-mixed outside the polymerization system at an appropriate temperature, which is generally from about −20° C. to about 80° C., and the resulting catalyst composition is then added to the monomer solution.

Third, the catalyst composition may be pre-formed in the presence of at least one conjugated diene monomer. That is, the catalyst ingredients are pre-mixed in the presence of a small amount of conjugated diene monomer at an appropriate temperature, which is generally from about −20° C. to about 80° C. The amount of conjugated diene monomer that is used for pre-forming the catalyst can range from about 1 to about 500 moles per mole, more preferably from about 5 to about 250 moles per mole, and even more preferably from about 10 to about 100 moles per mole of the lanthanide compound. The resulting catalyst composition is then added to the remainder of the conjugated diene monomer that is to be polymerized.

Fourth, the catalyst composition may be formed by using a two-stage procedure. The first stage involves combining the alkylating agent with the lanthanide compound in the absence of conjugated diene monomer or in the presence of a small amount of conjugated diene monomer at an appropriate temperature, which is generally from about −20° C. to about 80° C. In the second stage, the foregoing reaction mixture and the remaining catalyst components are charged in either a stepwise or simultaneous manner to the remainder of the conjugated diene monomer that is to be polymerized.

Fifth, the catalyst composition may be formed by using a different two-stage procedure. The first stage involves combining the alkylating agent with the lanthanide compound and the nickel-containing compound in the absence of conjugated diene monomer or in the presence of a small amount of conjugated diene monomer at an appropriate temperature, which is generally from about −20° C. to about 80° C. In the second stage, the foregoing reaction mixture and the halogen-containing compound, non-coordinating anion, or non-coordinating anion precursor are charged in either a stepwise or simultaneous manner to the remainder of the conjugated diene monomer that is to be polymerized.

When a solution of the catalyst composition or one or more of the catalyst ingredients is prepared outside the polymerization system as set forth in the foregoing methods, an organic solvent or carrier is preferably employed. The organic solvent may serve to dissolve the catalyst composition or ingredients, or the solvent may simply serve as a carrier in which the catalyst composition or ingredients may be suspended. The organic solvent is preferably inert to the catalyst composition. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred.

The catalyst composition of this invention exhibits very high catalytic activity for polymerizing conjugated dienes into cis-1,4-polydienes. Although one preferred embodiment is directed toward the polymerization of 1,3-butadiene into cis-1,4-polybutadiene, other conjugated dienes can also be polymerized. Some specific examples of other conjugated dienes that can be polymerized include isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

The production of cis-1,4-polydiene is accomplished by polymerizing conjugated diene monomer in the presence of a catalytically effective amount of the foregoing catalyst composition. The total catalyst concentration to be employed in the polymerization mass depends on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients should be used. Generally, the amount of the lanthanide compound used can be varied from about 0.01 to about 2 mmol, more preferably from about 0.02 to about 1 mmol, and even more preferably from about 0.05 to about 0.5 mmol per 100 g of conjugated diene monomer.

The polymerization is preferably carried out in an organic solvent as the diluent. In one embodiment, a solution polymerization system is employed, which is a system where the monomer to be polymerized and the polymer formed are soluble in the polymerization medium. Alternatively, a precipitation polymerization system may be employed by choosing a solvent in which the polymer formed is insoluble. In both cases, the monomer to be polymerized is in a condensed phase. Also, the catalyst ingredients are preferably solubilized or suspended within the organic solvent. In other words, the catalyst ingredients are preferably not impregnated onto a catalyst support.

In performing these polymerizations, an amount of organic solvent in addition to the amount of organic solvent that may be used in preparing the catalyst composition is preferably added to the polymerization system. The additional organic solvent may be the same as or different from the organic solvent used in preparing the catalyst composition. An organic solvent that is inert with respect to the catalyst composition employed to catalyze the polymerization is preferably selected. Exemplary hydrocarbon solvents have been set forth above. When a solvent is employed, the concentration of the monomer to be polymerized is not limited to a special range. Preferably, however, the concentration of the monomer present in the polymerization medium at the beginning of the polymerization should be in a range of from about 3% to about 80% by weight, more preferably from about 5% to about 50% by weight, and even more preferably from about 10% to about 30% by weight. In one or more embodiments, the combination of catalyst, solvent, and monomer form a polymerization system or medium.

The polymerization of conjugated dienes may also be carried out by means of bulk polymerization, which refers to a polymerization environment where no solvents are employed. The bulk polymerization can be conducted either in a condensed liquid phase or in a gas phase.

The polymerization of conjugated dienes may be carried out as a batch process, a continuous process, or a semi-continuous process. In the semi-continuous process, monomer is intermittently charged as needed to replace that monomer already polymerized. In any case, the polymerization is preferably conducted under anaerobic conditions by using an inert protective gas such as nitrogen, argon or helium, with moderate to vigorous agitation. The polymerization temperature may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by adding a polymerization terminator that inactivates the catalyst. Typically, the terminator employed is a protic compound, which includes, but is not limited to, an alcohol, a carboxylic acid, an inorganic acid, water, or a mixture thereof. The addition of a protic compound or other compound useful for deactivating the catalyst or reactivity of the polymer may be referred to as quenching. In one or more embodiments, quenching of the polymerization medium is contemplated.

In one or more embodiments, prior to quenching, the high-cis polymers may be functionalized. The polymers prepared by using the lanthanide-based catalyst composition described herein may advantageously have some degree of pseudo-living characteristics. As a result, these polymers can be functionalized by reacting them with suitable functionalizing agents prior to or in lieu of terminating the polymer (i.e. quenching). Exemplary functionalizing agents include, but are not limited to, alkoxysilanes, imine-containing compounds, esters, ester-carboxylate metal complexes, alkyl ester carboxylate metal complexes, aldehydes or ketones, amides, isocyanates, isothiocyanates, imines, and epoxides. These types of functionalizing agents are described in, among other places, International Application Nos. PCT/US00/30743, PCT/US00/30875, and PCT/US00/30743; U.S. Pat. Nos. 4,906,706, 4,990,573, 5,064,910, 5,567,784, 4,736,001, 4,699,960, and 5,844,050; Japanese Patent Application Nos. 05-051406A, 05-059103A, 10-306113A, and 11-035633A, which are incorporated herein by reference. These functionalizing agents can be reacted with the pseudo-living polymers by admixing them together. The amount of functionalizing agent that is used can vary. Preferably, from about 0.01 to about 200 moles, and more preferably from about 0.1 to about 150 moles, of functionalizing agent per mole of lanthanide compound should be employed. In one or more embodiments, the functionalizing agents employed to functionalize the polymers are limited to mono-functional terminating agents, and therefore coupling of the pseudo-living polymers is limited. In one or more embodiments, the high-cis polymers are devoid, and in other embodiments substantially devoid, of coupling prior to treatment with a free radical source according to one or more embodiments of the present invention. Following reaction with the functionalizing agent, the polymer and catalyst solution is quenched as noted above.

Following quenching, the high-cis polymers (either functionalized or unfunctionalized) can be treated with numerous free radical sources. In one or more embodiments, the free radical source may include an electron beam. In other embodiments, the free radical source may include a chemical compound that can be activated to provide a free radical. These compounds, which may also be referred to as free radical initiators, may include free radical initiators such as peroxide and azo compounds, which are believed to accelerate the polymerization of the vinyl aromatic monomer. Exemplary peroxide compounds include, but are not limited to, tertiary butyl peroxyacetate, dibenzoyl peroxide, dilauroyl peroxide, t-butylhydroperoxide, ditertiary-butylperoxide, cumene hydroperoxide, dicumylperoxide, 1,1-bis(tertiary-butylperoxy)-3,3,5-trimethyl-cyclohexane, t-butylperoxy-benzoate, 1,1-bis(t-butylperoxy)-cyclohexane, benzoylperoxide, succinoylperoxide and t-butylperoxypivilate, and azo compounds such as azobisisobutyro-nitrile, azobis-2,4-dim-ethylvaleronitrile, azobiscyclohexanecarbo-nitrile, azobismethyl isolactate and azobiscyanovalerate. Typical amounts are well known in the art and may be used in the process of the present invention. In one or more embodiments, the amount added is less than that amount that will gel the polymer. In one or more embodiments, the amount is sufficient to couple at least 10 weight percent of the polymer, in other embodiments at least 20 weight percent of the polymer, in other embodiments at least 30 weight percent of the polymer, and in other embodiments at least 40 weight percent of the polymer. In these or other embodiments, up to about 90 weight percent of the polymer, in other embodiments up to 80 weight percent of the polymer, and in other embodiments up to 70 weight percent of the polymer is coupled.

In one or more embodiments, the high cis polymer and the free radical source are introduced in a solvent. For example, the high cis polymer may be dissolved or suspended in a solvent to form a polymer solution or cement, and the free radial source can be introduced to the polymer solution. Useful solvents include polar and non-polar organic solvents such as hydrocarbon solvents.

The high cis polymer and the free radical source can be contacted by mixing or blending. This may take place by employing conventional equipment and/or conventional techniques such as continuously stirred tank reactors.

In one or more embodiments, the free radical source (e.g. peroxide) is added to solution in which the high cis polymers were synthesized. This may occur after quenching of the living polymer and catalyst ingredients but before isolation of the polymer product. Also, U.S. Pat. No. 7,030,195, which is incorporated herein by reference, likewise teaches methods for treating solutions of high cis polydienes with peroxides.

In one or more embodiments, the high-cis polymer, prior to treatment and/or coupling with the free radical source, may be characterized by a molecular weight distribution (Mw/Mn) of at least 3.0, in other embodiments at least 3.2, in other embodiments at least 3.4, in other embodiments at least 3.6, and in other embodiments at least 3.8. In these or other embodiments, the high-cis polymers, after treatment and/or coupling with the free radical source, may be characterized by a molecular weight distribution (Mw/Mn) of at least 3.0, in other embodiments at least 3.2, in other embodiments at least 3.4, in other embodiments at least 3.6, and in other embodiments at least 3.8. The weight average molecular weight (Mw) and the number average molecular weight (Mn) can be determined by using conventional GPC procedures with polystyrene standards.

Hydrogentation of Branched Polymers

The branched polymers prepared according to one or more embodiments of the present invention may be further treated to hydrogenate the polymers. This may be advantageous in certain uses of the polymers.

In one or more embodiments, the degree of hydrogenation can be expressed in terms of the percentage of double bonds (i.e., original olefinic double bonds) remaining after hydrogenation. In one embodiment, zero percent (i.e. essentially zero remaining double bonds), in other embodiments up to about 5%, and in other embodiments up to about 10%, in other embodiments up to about 15%, in other embodiments up to about 20%, and in other embodiments up to about 30% of the original double bonds remain after hydrogenation. In these or other embodiments, the polydiene is at least 10% hydrogenated, in other embodiments at least 20% hydrogenated, and in other embodiments at least 30% hydrogenated.

In one or more embodiments, the branched polymers may be hydrogenated by treating them with a homogeneous or heterogeneous transition metal catalyst system. Alternatively, organic systems such as diimide systems (e.g., hydrazine) may be employed. Hydrogenation techniques and catalysts for use in hydrogenation are well known as described in "Chemical Modification of Polymers: Catalytic Hydrogenation and Related Reactions" by McManus et al., *J. M. S.-Rev. Macromol. Chem. Phys.*, C35(2), 239-285 (1995), "Coordination Catalyst for the Selective hydrogenation of Polymeric Unsaturation," by Falk, *Journal of Polymer Science: Part A*-1, Vol. 9, 2617-2623 (1971), "The Hydrogenation of HO-Terminated Telechelic Polybutadienes in the Presence of a Homogeneous Hydrogenation Catalyst Based on Tris(triphenylphosphine)rhodium Chloride" by Bouchal et al., Institute of Macromolecular Chemistry, *Die Angewandte Makromolekular Chemie* 165, 165-180 (Nr. 2716) (1989), Hydrogenation of Low Molar Mass OH-Telechelic Polybutadienes Catalyzed by Homogeneous Ziegler Nickel Catalysts, by Sabata et al., *Journal of Applied Polymer Science*, Vol. 85, 1185-1193 (2002), "An Improved Method for the Diimide Hydrogenation of Butadiene and Isoprene Containing Polymers, by Hahn, *Journal of Polymer Science: Part A: Polymer Chemistry*, Vol. 30, 397-408 (1992), and Hydrogenation of Low-Molar-Mass, OH-Telechelic Polybutadienes. I. Methods Based on Diimide" by Holler, *Journal of Applied Polymer Science*, Vol 74, 3203-3213 (1999), which are incorporated herein by reference. Partial hydrogenation of conjugated dienes is described in U.S. Pat. Nos. 4,590,319, 5,242,986, and 6,184,307, all of which are hereby incorporated by reference. Partial hydrogenation of aromatic hydrocarbons to form cycloalkenes is described more fully in U.S. Pat. Nos. 4,197,415, 4,392,001, and 5,589,600, all of which are hereby incorporated by reference.

Use of Branched Polymers

In one or more embodiments, the branched polymers disclosed herein may be employed in preparing tire components. These tire components can be prepared by using the branched polymers of this invention alone or together with other rubbery polymers. Other rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

These rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in 20 Kirk-Othmer, *Encyclopedia of Chemical Technology,* 365-468, ($3^{rd}$ Ed. 1982), particularly *Vulcanization Agents and Auxiliary Materials,* 390-402, and A. Y. Coran, *Vulcanization* in *Encyclopedia of Polymer Science and Engineering,* ($2^{nd}$ Ed. 1989), which are incorporated herein by reference. Vulcanizing agents may be used alone or in combination. In one or more embodiments, the preparation of vulcanizable compositions and the construction and curing of the tire is not affected by the practice of this invention.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These compositions are useful for forming tire components such as treads, subtreads, black sidewalls, body ply skins, bead filler, and the like. Preferably, the functional polymers are employed in tread formulations. In one or more embodiments, these tread formulations may include from about 10 to about 100% by weight, in other embodiments from about 35 to about 90% by weight, and in other embodiments from about 50 to 80% by weight of the branched polymer based on the total weight of the rubber within the formulation.

In one or more embodiments, the vulcanizable rubber composition may be prepared by forming an initial masterbatch that includes the rubber component and filler (the rubber component optionally including the branched polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the functionalized polymer of this invention can be added during these remills. Rubber compounding techniques and the additives employed therein are generally known as disclosed in Stephens, *The Compounding and Vulcanization of Rubber,* in *Rubber Technology* ($2^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. In one or more embodiments, the branched polymers, when they contain unsaturation, may be crosslinked into two three dimensional vulcanizate network. Where the branched polymers are saturated, such as where the branched polymers are hydrogenated (or substantially hydrogenated), and the rubber composition includes other rubber that is unsaturated, the branched polymers may be entrapped within the vulcanizate network. Pneumatic tires can be made as discussed in U.S. Pat. Nos. 5,866, 171, 5,876,527, 5,931,211, and 5,971,046, which are incorporated herein by reference.

In one or more embodiments, the branched polymers disclosed herein may be employed within adhesive compositions. In addition to the branched polymers, the adhesive compositions may include other adhesive constituents employed in the art.

In order to demonstrate the practice of the present invention, the following examples have been prepared and tested. The examples should not, however, be viewed as limiting the scope of the invention. The claims will serve to define the invention.

EXPERIMENTAL

Example 1

A multi-branched polymer was prepared by using a branched terminating agent. In an 8-oz bottle, 0.58 mL of diisopropenyl benzene, 0.95 mL of triethylamine and 5.1 mL of 1.33 M s-butyl lithium were added. The bottle was tumbled in a water bath at 50° C. for 1 hour. After this tumbling, 7 mL of 1 M lithium-tert-butoxide were added. Simultaneously, eleven 24-oz bottles were charged with 154 g of hexane and 131 g of 1,3-butadiene/hexane blend (containing 21.7% by weight of 1,3-butadiene). 1.7 mL of 1.68 M n-butyl lithium were added to each of the bottles, which were then placed in a water bath at 50° C. for 1 hour. The bottles were then tumbled in a room temperature bath for 30 minutes. One of the bottles was then terminated with an isopropanol-BHT solution for characterization. To each bottle, 0.66 mL of 1.29 M silicon tetrachloride were added. The bottles were tumbled again in the room temperature bath for 30 minutes.

Simultaneously, a two-gallon stainless steel batch reactor was charged with 1.24 lbs of hexane and 3.46 lbs of 1,3-butadiene/hexane blend (containing 21.7% by weight of 1,3- butadiene). The jacket of the reactor was heated to 150° F. When the batch reached 133° F., the lithium difunctional initiator prepared in the 8-oz bottle above was added. The polymerization exothermed at 216.1° F. after 33 minutes of reaction. After 34 minutes, the jacket temperature was set to 100° F. and a sample was dropped for analysis. A modifier (1.60 M; 17 mL) was added to the reactor, followed by 9 bottles of branched polymer terminating agent prepared above. After 1.5 hours, a sample was dropped for analysis and 2.0 mL of n-butyl lithium were added to the reactor. After 2.5 hours of reaction, the reaction mixture was cooled down and dropped in isopropanol containing BHT. The coagulated polymer was then isolated and drum-dried. The final polymer contained no measurable gel.

Analysis of the samples at the various stages gives the following data. It should be noted that GPC molecular weight results are absolute values for linear polymers only and Mn data for branched species are only approximate (underestimated).

| ~Li | ~SiCl | Li~Li | Final Polymer (Si-Si branched) |
|---|---|---|---|
| Mn = 9.9 kg/mol Mw/Mn = 1.14 | Mn = 24.9 kg/mol MW/MN = 1.06 | Bimodal: $M_{Peak\,1}$ = 86.4 kg/mol (86%) $M_{Peak\,2}$ = 170.8 kg/mol (14%) | Bimodal: $M_{Peak\,1}$ = 27.9 kg/mol (15%) $M_{Peak\,2}$ = 117.1 kg/mol (85%) |

Example 2

The multi-branched polymer prepared in Example 1 was blended in a fifty-fifty weight ratio with a linear polymer. The linear polymer was prepared by anionic polymerization techniques using n-butyllithium as an initiator and water as a terminator. The linear polymer was characterized by 7.4% vinyl, a $T_g$ of –90° C., an $M_n$ of 37 kg/mole, and an $M_w/M_n$ of 1.04.

Example 3

A multi-branched polymer was prepared by using a branched terminating agent. In an 8-oz bottle, 0.35 mL of diisopropenyl benzene, 0.57 mL of triethylamine and 3.1 mL of 1.33 M s-butyl lithium were added. The bottle was tumbled in a water bath at 50° C. for 1 hour. After this tumbling, 4.1 mL of 1 M lithium-tert-butoxide were added. Simultaneously, twelve 24-oz bottles were charged with 148 g of hexane and 137 g of 1,3-butadiene/hexane blend (containing 20.8% by weight of 1,3-butadiene). 0.93 mL of 1.54 M n-butyl lithium were added to each of the bottles, which were then placed in a water bath at 50° C. for 1 hour. The bottles were then tumbled in a room temperature bath for 30 minutes. One of the bottles was then terminated with an isopropanol-BHT solution for characterization. To each of the other bottles, 0.33 mL of 1.29 M silicon tetrachloride were added. The bottles were tumbled again in the room temperature bath for 30 minutes.

Simultaneously, a two gallon stainless steel batch reactor was charged with 0.55 lbs of hexane and 2.16 lbs of 1,3-butadiene/hexane blend (containing 20.8% by weight of 1,3-butadiene). The jacket of the reactor was heated to 150° F. When the batch reached 145° F., the lithium difunctional initiator prepared in the 8-oz bottle above was added. The polymerization exothermed at 174.6° F. after 33 minutes of reaction. After 34 minutes, the jacket temperature was set to 100° F. and a sample was dropped for analysis. A modifier (1.60 M; 17 mL) was added to the reactor, followed by the remaining 10 bottles of branched polymer terminating agent prepared above. After 2 hours, the temperature control was turned off and the reaction was stirred at 87° F. for 19 hours. A sample was then dropped for analysis and 2.0 mL of n-butyl lithium were added to the reactor. After 1 hours of reaction, the reaction mixture was dropped in isopropanol containing BHT. The coagulated polymer was then isolated and drum-dried. The final polymer contained 2% gel.

Analysis of the samples at the various stages gives the following data. It should be noted that GPC molecular weight results are absolute values for linear polymers only and Mn data for branched species are only approximate (underestimated).

| ~Li | ~SiCl | Li~Li | Final Polymer (Si-Si branched) |
|---|---|---|---|
| Mn = 16.8 kg/mol Mw/Mn = 1.10 | Mn = 41.2 kg/mol MW/MN = 1.07 | Bimodal: $M_{Peak\,1}$ = 77.1 kg/mol (82%) $M_{Peak\,2}$ = 142.8 kg/mol (18%) | Bimodal: $M_{Peak\,1}$ = 54.8 kg/mol (21%) $M_{PEAK\,2}$ = 134.5 KG/MOL (79%) |

Example 4

A functionalized-branched polymer was prepared as follows. A two-gallon stainless steel reactor was charged with 2.88 lbs of hexane and 4.75 lbs of 1,3-butadiene/hexane blend (containing 22% by weight of 1,3-butadiene). The jacket of the reactor was heated to 150° F. When the batch reached 138° F., 4.3 mL of 1.23 M tributyltin lithium were added, diluted with about 20 mL of hexane. The polymerization exothermed at 174.5° F. after 16 minutes of reaction. After 25 minutes, a sample was dropped for analysis. A second initiator, n-butyl lithium(10.2 mL of 1.54 M), was added to the reactor, followed by 2.10 lbs of 1,3-butadiene/hexane blend (containing 22% by weight of 1,3-butadiene). A second exotherm peak was observed at 159.6° F. after 16 minutes. A sample was dropped for analysis after 20 minutes and 6.0 mL of 0.86 M silicon tetrachloride were added to the reactor. After 1 hour, a sample was dropped for analysis and 2.0 mL of n-butyl lithium were added to the reactor. After 1.5 hours of reaction, the reaction mixture was cooled down and dropped in isopropanol containing BHT. The coagulated polymer was then isolated and drum-dried.

Analysis of the samples at the various stages gives the following data. It should be noted that GPC molecular weight results are absolute values for linear polymers only and Mn data for branched species are only approximate (underestimated).

| | |
|---|---|
| Bu$_3$Sn~~Li | M$_{peak}$ = 78.9 kg/mol |
| Bu$_3$Sn~~Li  +  ~~Li | M$_{peak\,1}$ = 81.7 kg/mol and<br>M$_{peak\,2}$ = 10.4 kg/mol |
| Bu$_3$Sn~~Si~~ (branched) | M$_{peak\,1}$ = 31.9 kg/mol (11%, four-short arm star), M$_{peak\,2}$ = 106.0 kg/mol (53%, desired umbrella), M$_{peak\,3}$ = 177.4 kg/mol (36%, two-long arm and two-short arm star). |

Example 5

A functionalized-branched polymer was prepared as follows. A two-gallon stainless steel batch reactor was charged with 2.94 lbs of hexane and 4.34 lbs of 1,3-butadiene/hexane blend (containing 22% by weight of 1,3-butadiene). The jacket of the reactor was heated to 150° F. When the batch reached 138° F., 3.9 mL of 1.23 M tributyltin lithium were added, diluted with about 20 mL of hexane. The polymerization exothermed at 167.5° F. after 16 minutes of reaction. After 20 minutes, a sample was dropped for analysis. A second initiator, n-butyl lithium (18.5 mL of 1.54 M), was added to the reactor, followed by 2.43 lbs of 1,3-butadiene/hexane blend (containing 22% by weight of 1,3-butadiene). A second exotherm peak was observed at 160.5° F. after 15 minutes. A sample was dropped for analysis after 18 minutes and 6.9 mL of 0.86 M silicon tetrachloride were added to the reactor. After 1.5 hours, a sample was dropped for analysis and 2.3 mL of n-butyl lithium were added to the reactor. After 1.5 hours of reaction, the reaction mixture was cooled down and dropped in isopropanol containing BHT. The coagulated polymer was then isolated and drum-dried.

Analysis of the samples at the various stages gives the following data. It should be noted that GPC molecular weight results are absolute values for linear polymers only and Mn data for branched species are only approximate (underestimated).

| | |
|---|---|
| Bu$_3$Sn~~Li: | M$_{peak}$ = 74.9 kg/mol |
| Bu$_3$Sn~~Li  +  ~~Li: | M$_{peak\,1}$ = 80.3 kg/mol and<br>M$_{peak\,2}$ = 7.4 kg/mol |
| Bu$_3$Sn~~Si~~ (branched) | M$_{peak\,1}$ = 8.2 kg/mol (9%, uncoupled short arms), M$_{peak\,2}$ = 23.9 kg/mol (16%, four-short arm star), M$_{peak\,3}$ = 90.4 kg/mol (61%, desired umbrella), M$_{peak\,4}$ = 160.6 kg/mol (14%, two-long arm and two-short arm star). |

Example 6

A functionalized-branched polymer was prepared as follows. A two-gallon stainless steel batch reactor was charged with 2.94 lbs of hexane and 4.40 lbs of 1,3-butadiene/hexane blend (containing 21.9% by weight of 1,3-butadiene). The jacket of the reactor was heated to 150° F. When the batch reached 130° F., 3.9 mL of 1.23 M tributyltin lithium were added, diluted with about 20 mL of hexane. The polymerization exothermed at 177.3° F. after 17 minutes of reaction. After 23 minutes, a sample was dropped for analysis. A second initiator, n-butyl lithium (18.5 mL of 1.54 M), was added to the reactor, followed by 2.45 lbs of 1,3-butadiene/hexane blend (containing 21.9% by weight of 1,3-butadiene). A second exotherm peak was observed at 162.5° F. after 15 minutes. A sample was dropped for analysis after 30 minutes and 9.7 mL of 0.86 M silicon tetrachloride were added to the reactor. After 1 hour, a sample was dropped for analysis and 2.3 mL of n-butyl lithium were added to the reactor. After 1.5 hours of reaction, the reaction mixture was cooled down and dropped in isopropanol containing BHT. The coagulated polymer was then isolated and drum-dried.

Analysis of the samples at the various stages gives the following data. It should be noted that GPC molecular weight results are absolute values for linear polymers only and Mn data for branched species are only approximate (underestimated).

| | |
|---|---|
| Bu$_3$Sn~~Li | M$_{peak}$ = 77.5 kg/mol |
| Bu$_3$Sn~~Li  +  ~~Li | M$_{peak\,1}$ = 83.2 kg/mol and<br>M$_{peak\,2}$ = 7.8 kg/mol |
| Bu$_3$Sn~~Si~~ (branched) | M$_{peak\,1}$ = 23.8 kg/mol (20%, four-short arm star), M$_{peak\,2}$ = 98.6 kg/mol (60%, desired umbrella), M$_{peak\,3}$ = 172.7 kg/mol (20%, two-long arm and two-short arm star). |

Example 7

A star polymer was prepared as follows. A two-gallon stainless steel batch reactor was charged with 2.82 lbs of hexane and 5.90 lbs of 1,3-butadiene/hexane blend (containing 22.9% by weight of 1,3-butadiene). The jacket of the reactor was heated to 150° F. When the batch reached 141° F., 10.5 mL of 1.68 M n-butyl lithium were added, diluted with about 20 mL of hexane. The polymerization exothermed at 189.6° F. after 13 minutes of reaction. After 17 minutes, a sample was dropped for analysis. OOPS modifier (1.60 M; 10 mL) was added to the reactor, followed by 5 mL of 0.87 M silicon tetrachloride. After 3.5 hours, a sample was dropped for analysis and 2.0 mL of n-butyl lithium were added to the reactor (to terminate any silicon chloride ends that might still be there and favor the formation of gel in the polymer after work-up). After 1 hour of reaction, the reaction mixture was cooled down and dropped in isopropanol containing BHT. The coagulated polymer was then isolated and drum-dried. The polymer contained 1.5% gel.

Analysis of the samples at the various stages gives the following data. It should be noted that GPC molecular weight results are absolute values for linear polymers only and Mn data for branched species are only approximate (underestimated).

| ~~Li | ~~Si~~ (branched) (final polymer) |
|---|---|
| Mn = 37.9 kg/mol | Mn = 95.8 kg/mol |
| Mw/Mn = 1.09 | Mw/Mn = 1.12 |

The GPC of the final product also shows 6% of Mn=39 kg/mol (uncoupled short arms).

Example 8

Multi-branched polymers (coupled star) were prepared as follows. The star polymer of Example 7 was reacted with 0.5 phr of 2,2'-azobis-(2-isobutyronitrile) (AIBN) in a Brabender mixer at 120° C. for 5 minutes using a mixing speed of 50 RPM. After this reaction, 1.0 phr of butylated hydroxyltoluene (BHT) antioxidant was added to the modified polymer in the Brabender and mixed for one minute at 50 RPM and 120° C. GPC results for the final modified polymer indicate that 32% of the initial star molecules were randomly coupled together by this process. The final polymer contained 2.0% gel.

Example 9

Multi-branched polymers (coupled star) were prepared as follows. The star polymer of Example 5 was reacted with 2.0 phr of 2,2'-azobis-(2-isobutyronitrile) (AIBN) in a Brabender mixer at 120° C. for 5 minutes using a mixing speed of 50 RPM. After this reaction, 1.0 phr of butylated hydroxyltoluene (BHT) antioxidant was added to the modified polymer in the Brabender and mixed for one minute at 50 RPM and 120° C. GPC results for the final modified polymer indicate that 47% of the initial star molecules were randomly coupled together by this process. The final polymer contained 11.5% gel.

The polymer of Example 7 was blended with the polymer of Example 2 in a 50/50 weight ratio. The polymers were co-dissolved in hexane to form a 10% solids solution and the solvent was subsequently evaporated.

Example 10

The multi-branched polymer (coupled star) prepared in Example 9 was blended in a fifty-fifty weight ratio with a linear polymer. The linear polymer was prepared by anionic polymerization techniques using n-butyllithium as an initiator and water as a terminator. The linear polymer was characterized by 7.4% vinyl, a $T_g$ of −90° C., an $M_n$ of 37 kg/mole, and an $M_w/M_n$ of 1.04.

Example 11

Dedrigraft polymers were prepared according to the following method. 2.0 lbs of technical grade hexane (dried to <5 ppm water and under $N_2$ pressure) was charged to a 1 gallon stainless steel reactor. Then 4.62 mmol nBuLi and 0.18 mmol K-t-amylate was charged to the reactor. To a separate charging tank was weighed 1.0 lb of hexane, 3.15 lb of a blend of 22% 1,3-butadiene in hexane, 6.1 mmol divinylbenzene and 3.1 mmol dibutylamine. The heating jacket of the reactor was set at 160° F. When the reactor contents reached 120° F., the blend of monomer, crosslinking agent and transfer agent were metered to the reactor at 0.06 lb/min. Metering time was 85 minutes and the reactor reached a temperature of 158° F. 15 minutes after metering was completed, the polymer solution was precipitated in isopropanol containing the antioxidant, dibutyl-p-cresol. The precipitated polymer was drum-dried and a 92% yield was obtained. The 1,2-addition (vinyl content) of the polymer was 8%. The GPC characterization of the polymer gave Mn=82.1 kg/mol and Mw/Mn=2.50. It should be noted that GPC molecular weight results are absolute values for linear polymers only and Mn data for branched species are only approximate (underestimated).

Example 12

The same procedure as Example 11 was followed except that 0.4 mmol of 2,2-bis(tetrahydrofuryl)propane was used in place of the K-t-amylate. The 1,2-addition (vinyl content) of the polymer was 27%. The GPC characterization of the polymer gave Mn=83.2 kg/mol and Mw/Mn=2.99. It should be noted that GPC molecular weight results are absolute values for linear polymers only and Mn data for branched species are only approximate (underestimated).

Example 13

The same procedure as Example 11 was followed except that 2.56 mmol of 2,2-bis(tetrahydrofuryl)propane was used in place of the K-t-amylate. The 1,2-addition (vinyl content) of the polymer was 53%. The GPC characterization of the polymer gave Mn=62.6 kg/mol and Mw/Mn=2.09. It should be noted that GPC molecular weight results are absolute values for linear polymers only and Mn data for branched species are only approximate (underestimated)

Examples 14-18

The multi-branched polymer blend of Example 2 was employed to make rubber compositions that were cured into rubber vulcanizates. Comparative samples were also prepared and tested. The formulations of the compositions are provided in Table I. The amounts provided in the tables are set forth in parts by weight unless otherwise specified.

TABLE I

|  | (phr) |
| --- | --- |
| Master Batch | |
| Polymers | 100 |
| Carbon Black-N343 | 41 |
| Aromatic Oil | 10.5 |
| Stearic Acid | 2 |
| Wax Blend | 1 |
| Zinc Oxide | 2.5 |
| Santoflex A.O. | 0.95 |
| Final Batch | |
| Master Batch | 157.95 |
| Sulfur | 1.3 |
| DPG Accelerator | 0.2 |
| CBS Accelerator | 1.7 |

The polymer component of each sample was varied as set forth in Table II together with the results of various tests that were performed on the samples. Each rubber composition was prepared in two mixing segments named master batch and final batch. A Brabender mixer was used for compounding the 300 gram batches. In the case of the master batch, a mixer speed of 60 RPM was used with an initial temperature of 130° C. A total mixing time of 5 minutes was used and drop temperatures were in the range of 160 to 170° C. Immediately following the master batch, the mixture was transferred to a mill operating at a temperature of 60° C., where it was milled/sheeted and subsequently cooled to room temperature. The mill processing behavior of each master batch was rated based on mill bagging, releasability, surface roughness, and edge quality characteristics. The final batch was mixed by adding the master batch and the curatives to the mixer simultaneously. The initial mixer temperature was 70° C. and the mixing speed was 40 RPM. The final material was removed from the mixer after 2.5 minutes and the material temperature at that time was between 90 and 100° C. The final batches were milled and sheeted using a mill at 60° C. The mill processing behavior of each final batch was rated based on mill bagging, releasability, surface roughness, and edge quality. A mill processability rating, ranging from 0 (poor) to 10

(excellent), was assigned to each stock based on the average of the ratings from the master and final batches. Button samples (7.9 mm dia.×15 mm) and sheets (15.24 cm×15.24 cm×0.19 cm; 15.24 cm×15.24 cm×0.25 cm) were also formed from the sheeted stocks by curing at 171° C. for 15 minutes in standard molds placed in a hot press.

The wear resistance of the test samples were evaluated using the Lambourn Abrasion test. Test specimens are rubber wheels of about 48 mm in outside diameter, about 22 mm in inside diameter and about 4.8 mm in thickness. The test specimens were placed on an axle and run at a slip ratio of 65% against a driven abrasive surface for approximately 75

TABLE II

| | Sample No. | | | | |
|---|---|---|---|---|---|
| | 14 | 15 | 16 | 17 | 18 |
| Butadiene Rubber | 100 | 90 | 80 | 80 | 80 |
| Natural Rubber | — | 10 | 20 | 10 | — |
| Multi-Branched Polymer Blend (Example 2) | — | — | — | 10 | 20 |
| ML1 + 4 @ 130° C.: | 39.9 | 38.4 | 37.0 | 35.0 | 32.1 |
| Mill Processability | 3 | 5 | 9 | 9 | 7 |
| Green Strength M50% (MPa): | 0.236 | 0.266 | 0.321 | 0.313 | 0.301 |
| Tack [0 day/5 day] (g): | 107/98 | 232/240 | 298/373 | 365/385 | 342/347 |
| 300% Modulus @ 23° C. (MPa): | 5.70 | 5.55 | 5.72 | 5.35 | 5.20 |
| Tensile Break Stress @ 23° C. (MPa): | 12.9 | 13.1 | 13.4 | 13.2 | 12.7 |
| Elongation at Break @ 23° C. (%): | 495 | 495 | 507 | 525 | 512 |
| 200% Modulus @ 100° C. (MPa): | 2.95 | 2.88 | 2.89 | 2.75 | 2.78 |
| Tensile Break Stress @ 100° C. (MPa): | 5.75 | 5.88 | 6.98 | 5.71 | 5.85 |
| Elongation at Break @ 100° C. (%): | 314 | 311 | 363 | 331 | 336 |
| Ring Tear, Tear Strength @ 171° C. (kPA): | 14.8 | 14.0 | 12.9 | 13.4 | 13.7 |
| Lambourn Wear Index [65% slip]: | 100 | 101 | 97 | 99 | 97 |
| tan δ [torsion strip; 0° C.; 5 Hz, 2%]: | 0.189 | 0.191 | 0.191 | 0.204 | 0.222 |
| G'(MPa) [torsion strip; 0° C.; 5 Hz. 2%]: | 3.97 | 3.95 | 3.97 | 3.93 | 4.20 |
| tan δ [torsion strip; 50° C.; 5 Hz, 2%]: | 0.167 | 0.166 | 0.162 | 0.179 | 0.183 |
| G'(MPa) [torsion strip; 50° C.; 5 Hz, 2%]: | 2.82 | 2.81 | 2.76 | 2.67 | 2.69 |

The butadiene rubber was prepared by anionic polymerization techniques by employing n-butyllithium as an initiator and water as a terminator. The polymer was characterized by 11% vinyl, 38% cis-1,4, 51% trans 1,4, a $T_g$ of −93° C., and $M_n$ of 96 kg/mol, and an $M_w/M_n$ of 2.0.

Tensile mechanical properties were measured using ASTM-D 412 at 25° C. Tear mechanical properties were measured using ASTM-D 624 at 171° C.

The green stock Mooney viscosity measurements were taken at 130° C. The sample was preheated for 1 minute, a large rotor was started, and the torque was measured after 4 minutes of rotation. The mill processing behavior of each master batch was rated based on mill bagging, releasability, surface roughness, and edge quality characteristics. The mill processing behavior of each final batch was rated based on mill bagging, releasability, surface roughness, and edge quality. A mill processability rating, ranging from 0 (poor) to 10 (excellent), was assigned to each stock based on the average of the ratings from the master and final batches.

Dynamic properties were determined by using a Rheometrics Dynamic Analyzer (RDA). Tan δ and G' were obtained from temperature sweep experiments conducted with a frequency of 31.4 rad/sec using 0.5% strain for temperatures ranging from −100° C. to −10° C., and with 2% strain for temperatures ranging from −10° C. to 100° C.

seconds. The abrading surface used was 120 grit 3M-ite. A load of about 2.5 kg was applied to the rubber wheel during testing. A linear, least squares curve-fit is applied to the weight loss data as a function of time. The slope of the line is the abrasion rate. The reported abrasion index is one-hundred multiplied by the control compound abrasion rate divided by the experimental compound abrasion rate. Thus, an abrasion index greater than 100 indicates that the experimental compound is better (abrades at a lower rate) than the control compound.

Examples 19-25

In a manner similar to the preceding examples, rubber compositions and vulcanizates were prepared by employing the functionalized-branched polymers and the multi-branched polymers (coupled stars) as shown in Table III. The polymer component of each sample is set forth in Table III together with the results of various tests that were performed on the samples.

TABLE III

| | Sample No. | | | | | | |
|---|---|---|---|---|---|---|---|
| | 19 | 20 | 21 | 22 | 23 | 24 | 25 |
| Butadiene Rubber | 100 | 90 | 80 | 80 | 80 | 80 | 80 |
| Natural Rubber | — | 10 | 20 | 10 | 10 | 10 | 10 |
| Functionalized-Branched I Example No. 4 | — | — | — | 10 | — | — | — |
| Functionalized-Branched II Example No. 5 | — | — | — | — | 10 | — | — |
| Functionalized-Branched III Example No. 6 | — | — | — | — | — | 10 | — |
| Multi-Branched Coupled Stare Example 10 | — | — | — | — | — | — | 10 |
| ML 1 + 4 @ 130° C.: | 39.9 | 40.1 | 40.1 | 44.0 | 39.5 | 41.6 | 36.1 |

TABLE III-continued

| | Sample No. | | | | | | |
|---|---|---|---|---|---|---|---|
| | 19 | 20 | 21 | 22 | 23 | 24 | 25 |
| Mill Processability | 3 | 5 | 9 | 9 | 9 | 9 | 9 |
| Green Strength M50% (MPa) | 0.235 | 0.262 | 0.329 | 0.388 | 0.331 | 0.388 | 0.317 |
| Tack [0 day/5 day] (g): | 131/124 | 202/229 | 339/364 | 289/297 | 341/330 | 318/328 | 372/371 |
| 300% Modulus @ 23° C. (MPa): | 6.47 | 6.74 | 6.90 | 6.82 | 6.68 | 6.31 | 6.49 |
| Tensile Break Stress @ 23° C. (MPa): | 13.1 | 13.8 | 14.7 | 13.1 | 13.7 | 13.2 | 13.8 |
| Elongation at Break @ 23° C. (%) | 457 | 460 | 476 | 442 | 462 | 469 | 472 |
| 200% Modulus @ 100° C. (MPa): | 3.18 | 3.22 | 3.29 | 3.27 | 3.24 | 3.13 | 3.09 |
| Tensile Break Stress @ 100° C. (MPa): | 5.64 | 6.55 | 6.92 | 5.88 | 6.38 | 6.46 | 6.77 |
| Elongation at Break @ 100° C. (%): | 292 | 303 | 328 | 292 | 310 | 320 | 334 |
| Ring Tear, Tear Strength @ 171° C. (kPa): | 14.7 | 14.2 | 13.1 | 13.9 | 13.9 | 14.9 | 14.5 |
| Ring Tear, Travel at Tear @ 171° C. (%): | 438 | 405 | 383 | 395 | 389 | 422 | 413 |
| Lambourn Wear Index [65% slip]: | 100 | 98 | 94 | 103 | 105 | 100 | 98 |
| tan δ [torsion strip; 0° C.; 5 Hz, 2%] | 0.172 | 0.173 | 0.170 | 0.166 | 0.174 | 0.178 | 0.194 |
| G'(MPa) [torsion strip; 0° C.; 5 Hz, 2%]: | 4.23 | 4.19 | 4.03 | 4.05 | 3.98 | 3.88 | 3.98 |
| tan δ [torsion strip; 50° C.; 5 Hz, 2%]: | 0.148 | 0.146 | 0.142 | 0.130 | 0.144 | 0.141 | 0.160 |
| G'(MPa) [torsion strip; 50° C.; 5 Hz, 2%]: | 3.07 | 2.97 | 2.86 | 2.92 | 2.80 | 2.78 | 2.70 |

Examples 26-34

In a manner similar to the preceding samples, rubber compositions and vulcanizates were prepared by employing the dendigraft polymers of Examples 11-13. The polymer component of each sample is set forth in Table IV together with the results of various tests that were performed on the samples.

TABLE IV

| | Sample No. | | | | | | | | |
|---|---|---|---|---|---|---|---|---|---|
| | 26 | 27 | 28 | 29 | 30 | 31 | 32 | 33 | 34 |
| Butadiene Rubber | 100 | 90 | 80 | 80 | 80 | 80 | 80 | 80 | 80 |
| Natural Rubber (phr): | — | 10 | 20 | 10 | 10 | 10 | — | — | — |
| Dendrigraft BR (8% vinyl): Example 11 | — | — | — | 10 | — | — | 20 | — | — |
| Dendrigraft BR (27% vinyl): Example 12 | — | — | — | — | 10 | — | — | 20 | — |
| Dendrigraft BR (53% vinyl): Example 13 | — | — | — | — | — | 10 | — | — | 20 |
| ML 1 + 4 @ 130° C.: | 39.9 | 40.2 | 39.1 | 44.9 | 38.8 | 34.4 | 55.6 | 41.2 | 30.3 |
| Mill Processability | 3 | 5 | 9 | 8 | 9 | 9 | 4 | 5 | 8 |
| Green Strength M50% (MPa): | 0.228 | 0.238 | 0.311 | 0.289 | 0.305 | 0.292 | 0.269 | 0.287 | 0.269 |
| Tack [0 day/5 day] (g): | 115/109 | 211/237 | 316/353 | 288/290 | 305/327 | 327/344 | 206/199 | 299/204 | 201/193 |
| 50% Modulus @ 23° C. (MPa): | 0.96 | 0.95 | 0.92 | 0.97 | 0.95 | 0.94 | 1.13 | 0.92 | 0.97 |
| 300% Modulus @ 23° C. (MPa): | 5.75 | 5.69 | 5.68 | 6.06 | 5.80 | 5.67 | 7.63 | 5.55 | 5.88 |
| Tensile Break Stress @ 23° C. (MPa): | 13.5 | 13.3 | 13.3 | 13.5 | 12.3 | 12.6 | 14.2 | 12.7 | 11.7 |
| Elongation at Break @ 23° C. (%): | 511 | 514 | 513 | 503 | 474 | 498 | 455 | 505 | 466 |
| Tensile Break Stress @ 100° C. (MPa): | 5.87 | 6.02 | 5.97 | 6.68 | 7.40 | 5.33 | 7.13 | 5.57 | 5.84 |
| Elongation at Break @ 100° C. (%) | 324 | 320 | 334 | 340 | 368 | 335 | 301 | 314 | 317 |
| Lambourn Wear Index [65% slip] | 100 | 99 | 94 | 101 | 96 | 82 | 106 | 92 | 77 |
| tan δ [torsion strip; 0° C.; 5 Hz, 2%]: | 0.190 | 0.188 | 0.181 | 0.184 | 0.185 | 0.187 | 0.197 | 0.191 | 0.200 |
| G'(MPa) [torsion strip; 0° C.; 5 Hz, 2%]: | 4.13 | 4.16 | 4.19 | 4.06 | 4.01 | 4.27 | 4.70 | 4.13 | 4.35 |
| tan δ [torsion strip; 50° C.; 5 Hz, 2%]: | 0.158 | 0.154 | 0.150 | 0.154 | 0.152 | 0.154 | 0.162 | 0.162 | 0.166 |
| G(MPa) [torsion strip; 50° C.; 5 Hz, 2%]: | 2.92 | 2.96 | 2.96 | 3.03 | 2.81 | 2.96 | 3.30 | 2.81 | 2.96 |

Examples 35-36

A 2-gallon reactor was charged with 3.05 lbs hexane and 6.45 lbs butadiene blend (22 wt % in hexanes). The jacket of the reactor was heated to 80° F. When the batch reached 74° F., 11 mL of 1 M diisobutyl aluminum hydride (DIBAH), 1.87 mL of 0.588 M neodymium versatate, 0.24 mL of 0.09 M nickel octoate and 3.3 mL of 1 M diethyl aluminum chloride were added sequentially, diluted with about 20 mL of hexane. The jacket of the reactor was then heated to 150° F. The polymerization exothermed at 188.1° F. after 35 minutes of reaction. After 30 minutes, the batch was heated to 210° F. A sample was dropped for analysis. The lauroyl peroxide solution (203 mL at 0.044 g/mL) was added to the reactor. After one hour, the batch was cooled down and dropped in isopropanol containing butylated hydroxy toluene (BHT). The product was then isolated and drum-dried. The GPC results below are only valid for linear polymers; hence the Mw and Mn values are only approximate.

TABLE VII

| Example 35 | Base | Final |
|---|---|---|
| $ML_{1+4}$ @ 100° C. | 18.6 | 33.7 |
| t80 @ 100° C. (s) | 5.3 | 22.1 |
| Dilute Solution Viscosity | 2.33 | 2.35 |
| Gel % | 2.3 | 0.5 |
| GPC Mn (g/mol) | 71,700 | 69,200 |
| GPC Mw (g/mol) | 291,200 | 276,100 |
| GPC Mw/Mn | 4.06 | 3.99 |
| Cis-1,4 addition | 96.0 | same |

TABLE VII-continued

| Example 35 | Base | Final |
|---|---|---|
| Trans-1,4 addition | 3.4 | same |
| 1,2 (vinyl) addition | 0.6 | same |

A 2-gallon reactor was charged with 2.85 lbs hexane and 6.65 lbs butadiene blend (22 wt % in hexanes). The jacket of the reactor was heated to 80° F. When the batch reached 77° F., 35 mL of 0.68 M triisobutyl aluminum (TIBA), 2.15 mL of 0.498 M neodymium versatate, 0.24 mL of 0.09 M nickel octoate and 3.2 mL of 1 M diethyl aluminum chloride were added sequentially, diluted with about 20 mL of hexane. The jacket of the reactor was then heated to 180° F. The polymerization exothermed at 216.3° F. after 24 minutes of reaction. After 30 minutes, the batch was heated to 210° F. A sample was dropped for analysis. The lauroyl peroxide solution (115 mL 203 Ml at 0.044 g/Ml)) was added to the reactor. After one hour, the batch was cooled down and dropped in isopropanol containing BHT. The product was then isolated and drum-dried. The GPC results below are only valid for linear polymers; hence the Mw and Mn values are only approximate.

TABLE VIII

| Example 36 | Base | Final |
|---|---|---|
| $ML_{1+4}$ @ 100° C. | 18.8 | 46.6 |
| t80 @ 100° C. (s) | 5.3 | 34.7 |
| Dilute Solution Viscosity | 2.17 | 2.30 |
| Gel % | 2.5 | 0.8 |
| GPC Mn (g/mol) | 56,300 | 56,800 |
| GPC Mw (g/mol) | 280,800 | 253,400 |
| GPC Mw/Mn | 4.98 | 4.46 |
| Cis-1,4 addition | 95.8 | same |
| Trans-1,4 addition | 3.6 | same |
| 1,2 (vinyl) addition | 0.6 | same |

The branched polymers of Examples 35-36 were employed to prepare rubber compositions that were cured into vulcanizates. The formulation for the rubber compositions is provided in Table IX.

TABLE IX

FORMULATION

|  | (phr) |
|---|---|
| MASTER BRANCH | |
| Polymer | 100 |
| CB-N343 | 50 |
| Black Oil | 10 |
| Stearic Acid | 2 |
| Wax Blend | 1 |
| Zinc Oxide | 2.5 |
| Santoflex A.O. | 0.95 |
| FINAL BATCH | |
| Master Batch | 166.45 |
| Sulfur | 1.3 |
| DPG Accelerator | 0.2 |
| CBS Acclerator | 1.7 |

A Brabender internal mixer was used for compounding the 300 gram batches. In the case of the master batch, a mixer speed of 60 RPM was used with an initial temperature of 110° C. A total mixing time of 5 minutes was used and drop temperatures were in the range of 160 to 170° C. Immediately following the master batch, the mixture was transferred to a mill operating at a temperature of 60° C., where it was milled/sheeted and subsequently cooled to room temperature. The mill processing behavior of each master batch was rated based on mill bagging, releasability, surface roughness, and edge quality characteristics. The final batch was mixed by adding the master batch and the curatives to the mixer simultaneously. The initial mixer temperature was 70° C. and the mixing speed was 40 RPM. The final material was removed from the mixer after 2.5 minutes, and the temperature at that time was between 90 and 100° C. The final batches were milled and sheeted using a mill at 60° C. The mill processing behavior of each final batch was rated based on mill bagging, releasability, surface roughness, and edge quality. A mill processability rating, ranging from 0 (poor) to 10 (excellent), was assigned to each stock based on the average of the ratings from the master and final batches. Properties of these green (uncured) compounds were tested, including green strength, tack, bound rubber, Mooney viscosity, and rheological cure behavior. Button samples (9.4 mm diameter×15 mm length) and sheets (15.24 cm×15.24 cm×0.19 cm; 15.24 cm×15.24 cm×0.25 cm) were also formed from the sheeted stocks by curing at 171° C. for 15 minutes in standard molds placed in a hot press. Mechanical and viscoelastic properties of the cured samples were evaluated. The results of these tests are set forth in Table X. Comparison was made against a commercially available nickel polymer (Ni—BR), which was synthesized by employing known techniques for preparing high-cis polybutadiene polymers using a nickel-based catalyst, and against a neodymium polymer (Nd—BR), which was synthesized by employing known techniques for preparing high-cis polybutadiene using neodymium versatate, tri-isobutylaluminum, and diethylaluminum chloride as catalyst ingredients.

TABLE X

|  | Nd-BR | Ni-BR | Sample 35 | Sample 36 |
|---|---|---|---|---|
| Base Polymer $ML_{1+4}$ @ 100° C.: |  |  | 18.6 | 18.8 |
| Base Polymer t80 @ 100° C. (s): |  |  | 5.3 | 5.3 |
| Final Polymer $ML_{1+4}$ @ 100° C.: | 39.2 | 45.8 | 33.7 | 46.6 |
| Final Polymer t80 @ 100° C. (s) | 4.7 | 6.8 | 22.1 | 34.7 |
| Mw (kb/mol): | 250 | 253 | 276 | 253 |
| Mw/Mn: | 2.40 | 3.05 | 3.99 | 4.45 |
| Compound $ML_{1+4}$ @ 130° C.: | 50.7 | 53.1 | 37.5 | 49.2 |
| Picma Tack (g): | 240 | 207 | 518 | 366 |
| Green Self Adhesion Avg. Peeling Load(N): | 4.1 | — | 15.3 | — |
| Green Strength, M50% (MPa): | 0.208 | 0.206 | 0.178 | 0.219 |
| Mill Processability, Poor [1] –> Exc. [10] | 6.5 | 8.5 | 9 | 9 |
| 50% Modulus @ 23° C. (MPa): | 1.30 | 1.12 | 1.11 | 1.01 |
| 300% Modulus @ 23° C. (MPa): | 9.56 | 8.36 | 8.34 | 8.22 |
| Tensile Break Stress, Tb @ 23° C. (MPa): | 13.1 | 12.6 | 13.1 | 12.4 |
| Elongation at Break, Eb @ 23° C. (%): | 367 | 390 | 402 | 386 |
| 50% Modulus @ 100° C. (MPa): | 1.24 | 1.02 | 1.08 | 1.11 |
| 200% Modulus @ 100° C. (MPa): | 4.34 | 3.69 | 3.96 | 3.88 |
| Tensile Break Stress, Tb @ 100° C. (MPa): | 6.70 | 6.64 | 6.45 | 6.30 |
| Elongation at Break, Eb @ 100° C. (%): | 269 | 298 | 283 | 258 |

TABLE X-continued

|  | Nd-BR | Ni-BR | Sample 35 | Sample 36 |
| --- | --- | --- | --- | --- |
| Ring Tear, Tear Strength @ 171° C. (kN/m)): | 39.2 | 36.4 | 38.9 | 35.2 |
| Ring Tear, Travel at Tear @ 171° C. (%): | 398 | 467 | 482 | 413 |
| Lambourn Wear Index [65% slip]: | 100 | 92 | 94 | 96 |
| tanδ (torsion strip; −20° C.: 5 Hz, 2%]: | 0.198 | 0.230 | 0.232 | 0.220 |
| G'(MPa) (torsion strip; −20° C.: 5 Hz, 2%]: | 5.87 | 5.61 | 6.25 | 5.97 |
| tanδ (torsion strip; 0° C.: 5 Hz, 2%]: | .0171 | 0.207 | 0.212 | 0.209 |
| G'(MPa) (torsion strip; 0° C.: 5 Hz, 2%]: | 5.04 | 4.70 | 5.00 | 5.06 |
| tanδ (torsion strip; 50° C.: 5 Hz, 2%]: | 0.134 | 0.766 | 0.170 | 1.169 |
| G'(MPa) (torsion strip; 50° C.: 5 Hz, 2%]: | 4.03 | 3.62 | 3.76 | 3.62 |

Various modifications and alterations that do not depart from the scope and spirit of this invention will become apparent to those skilled in the art. This invention is not to be duly limited to the illustrative embodiments set forth herein.

What is claimed is:

1. A method of preparing a branched polymer, the method comprising the steps of:
   (a) polymerizing conjugated diene monomer with a catalyst system that is the combination or reaction product of (i) a lanthanide compound, (ii) an alkylating agent, (iii) a nickel-containing compound, and (iv) a source of halogen to form a high-cis polydiene; and
   (b) coupling the high-cis polydiene with a free radical source.

2. The method of claim 1, further comprising the step of hydrogenating the resulting polymer.

3. A tire component including the polymer prepared by the method of claim 1.

4. The method of claim 1, where said step of coupling takes place within an organic solvent in which the high-cis polydiene is dissolved.

5. The method of claim 1, where said step of polymerizing takes place within an organic solvent, and where the high-cis polydiene and catalyst are quenched prior to said step of coupling.

* * * * *